March 29, 1960 R. A. CHRISTIAN ET AL 2,930,523
TOTALIZER CONTROL MECHANISM FOR ACCOUNTING MACHINES
Filed Nov. 2, 1954 11 Sheets-Sheet 2
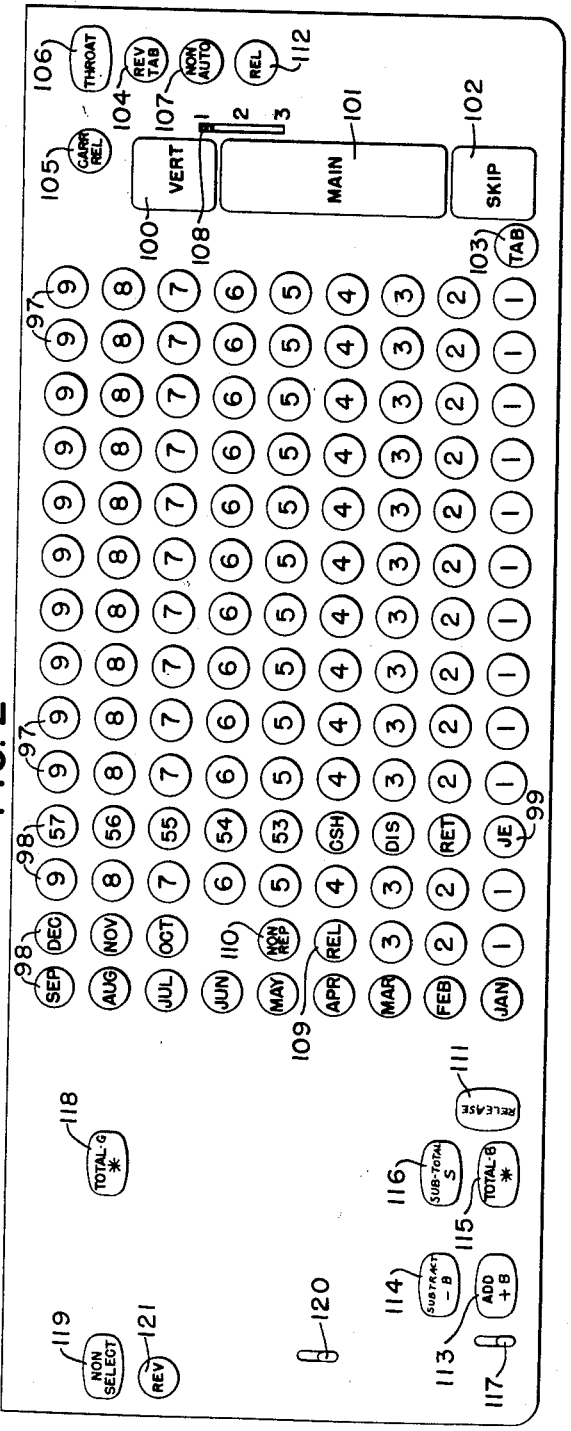
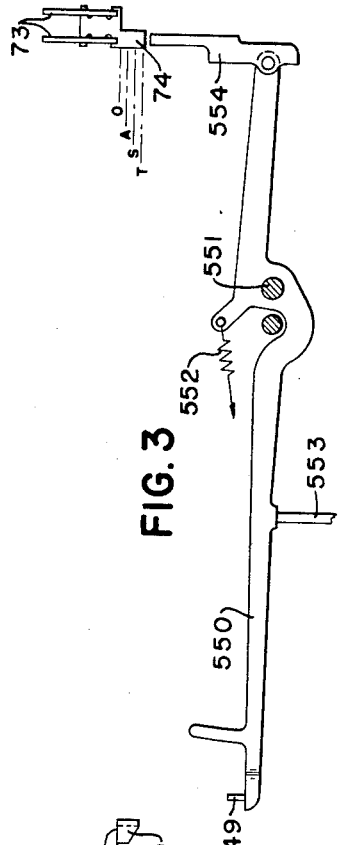
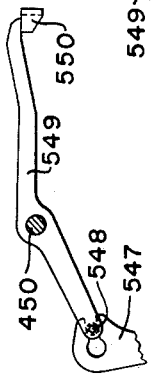
INVENTORS
RAYMOND A. CHRISTIAN
ARTHUR R. COLLEY
JESSE R. GANGER &
PAUL H. WILLIAMS
BY
THEIR ATTORNEYS March 29, 1960 R. A. CHRISTIAN ET AL 2,930,523
TOTALIZER CONTROL MECHANISM FOR ACCOUNTING MACHINES
Filed Nov. 2, 1954 11 Sheets-Sheet 3
FIG. 5A
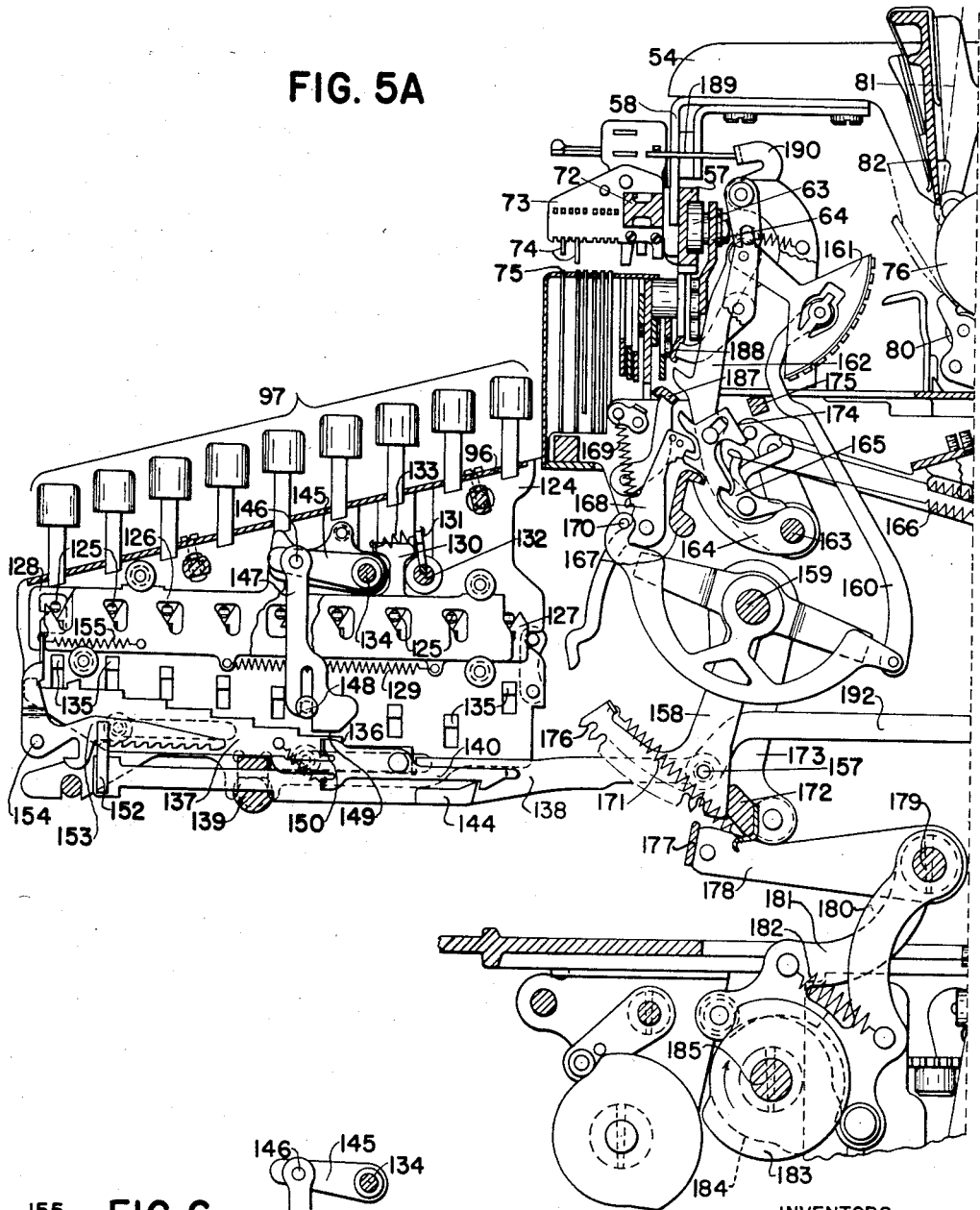
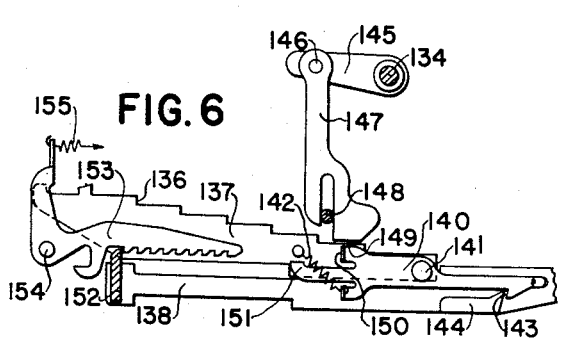
FIG. 6
INVENTORS
RAYMOND A. CHRISTIAN
ARTHUR R. COLLEY
JESSE R. GANGER &
PAUL H. WILLIAMS
BY *Karl Benst*
*Richard Van Busum*
THEIR ATTORNEYS

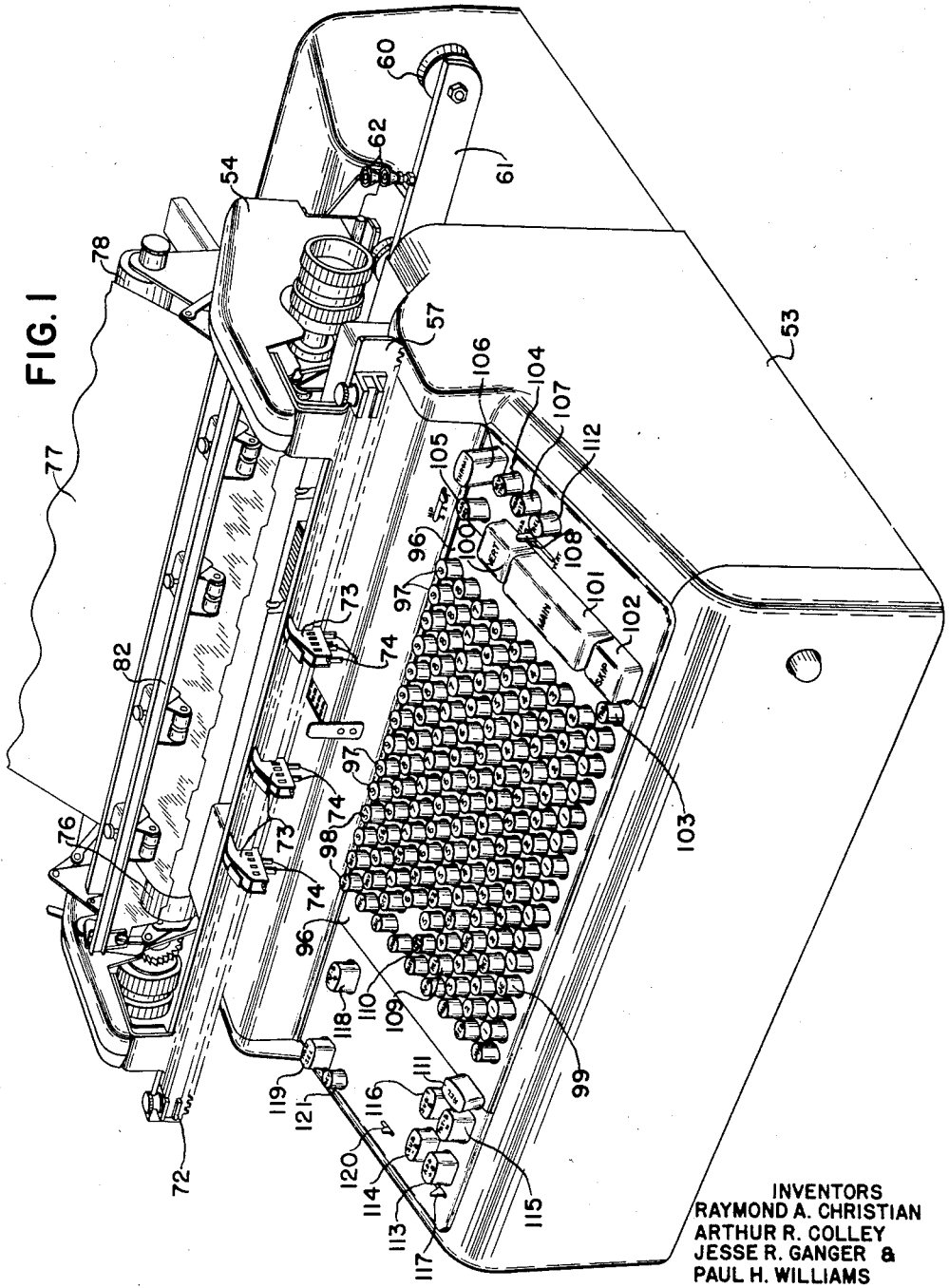

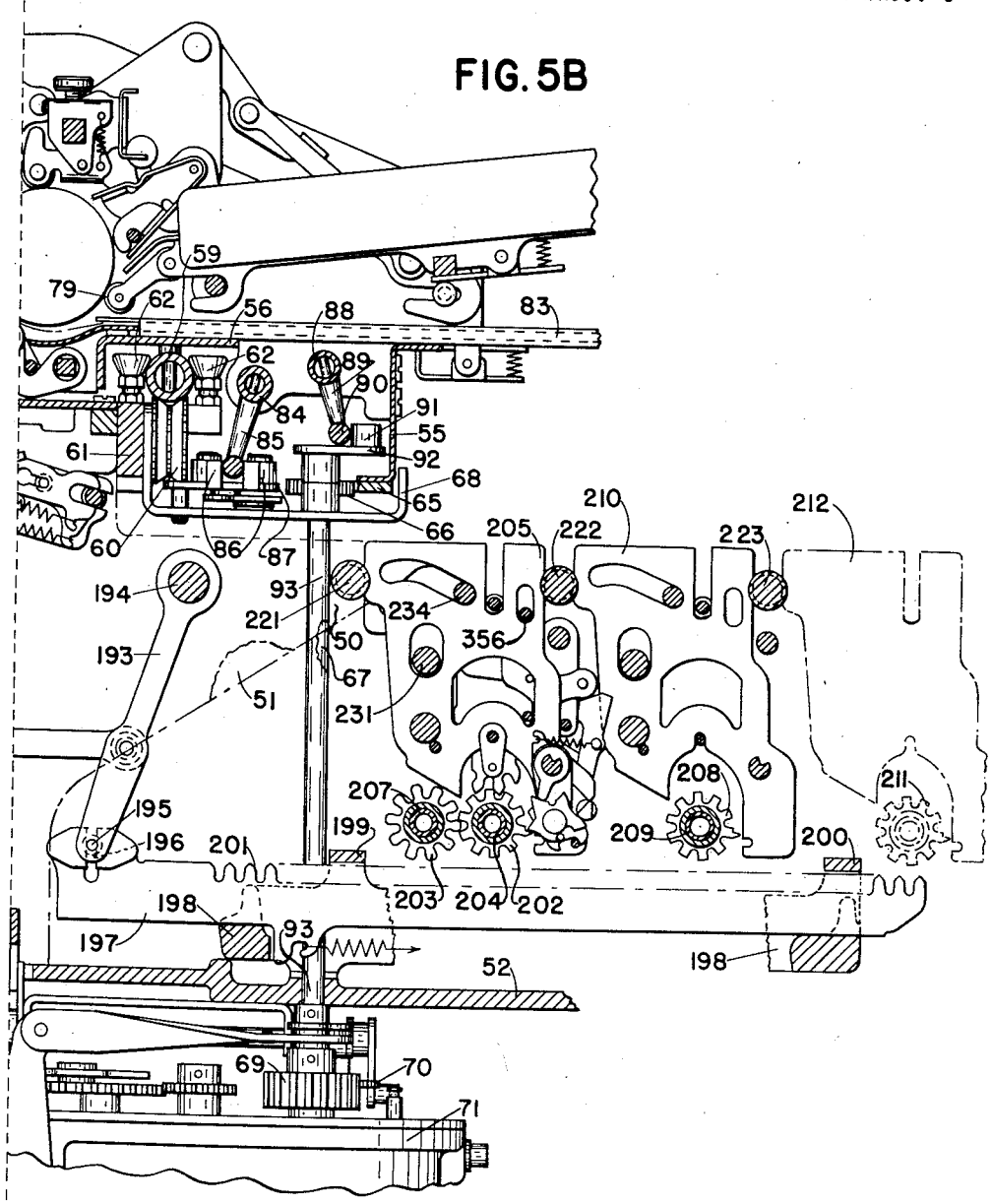

March 29, 1960 R. A. CHRISTIAN ET AL 2,930,523
TOTALIZER CONTROL MECHANISM FOR ACCOUNTING MACHINES
Filed Nov. 2, 1954 11 Sheets-Sheet 5
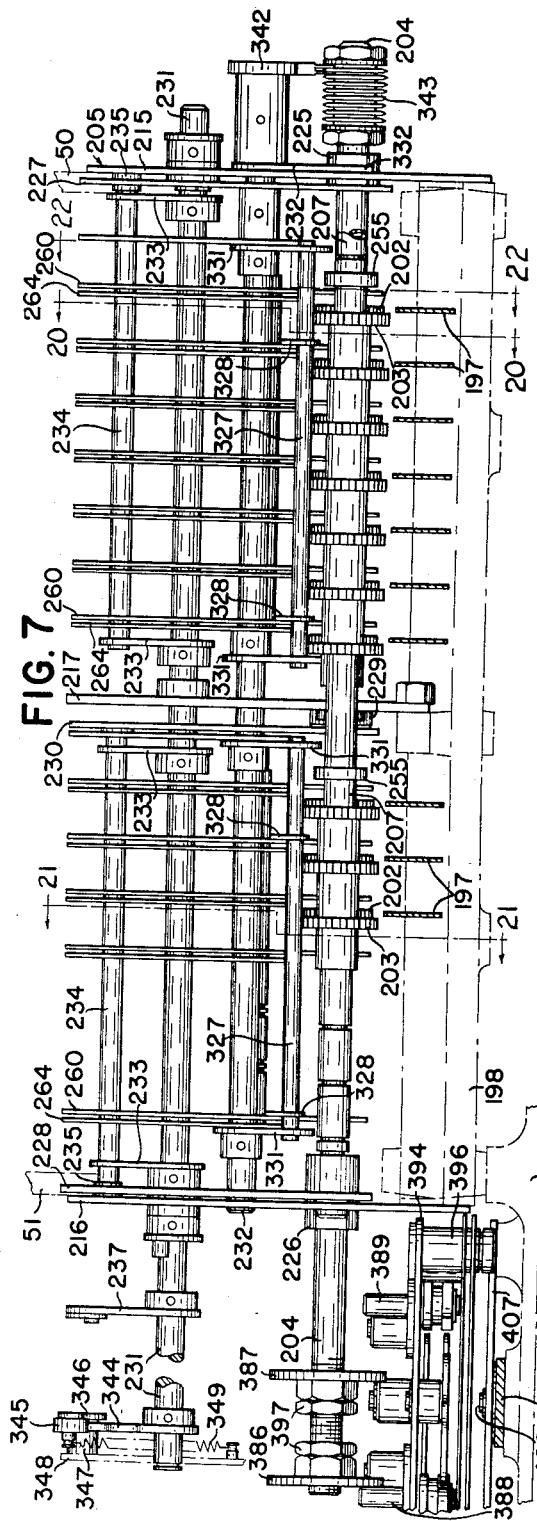
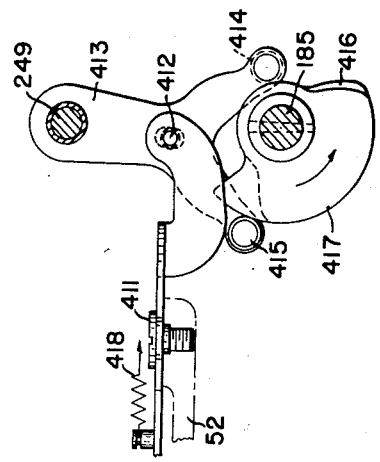
INVENTORS
RAYMOND A. CHRISTIAN
ARTHUR R. COLLEY
JESSE R. GANGER &
PAUL H. WILLIAMS
BY Carl Beust
Richard Van Buren
THEIR ATTORNEYS

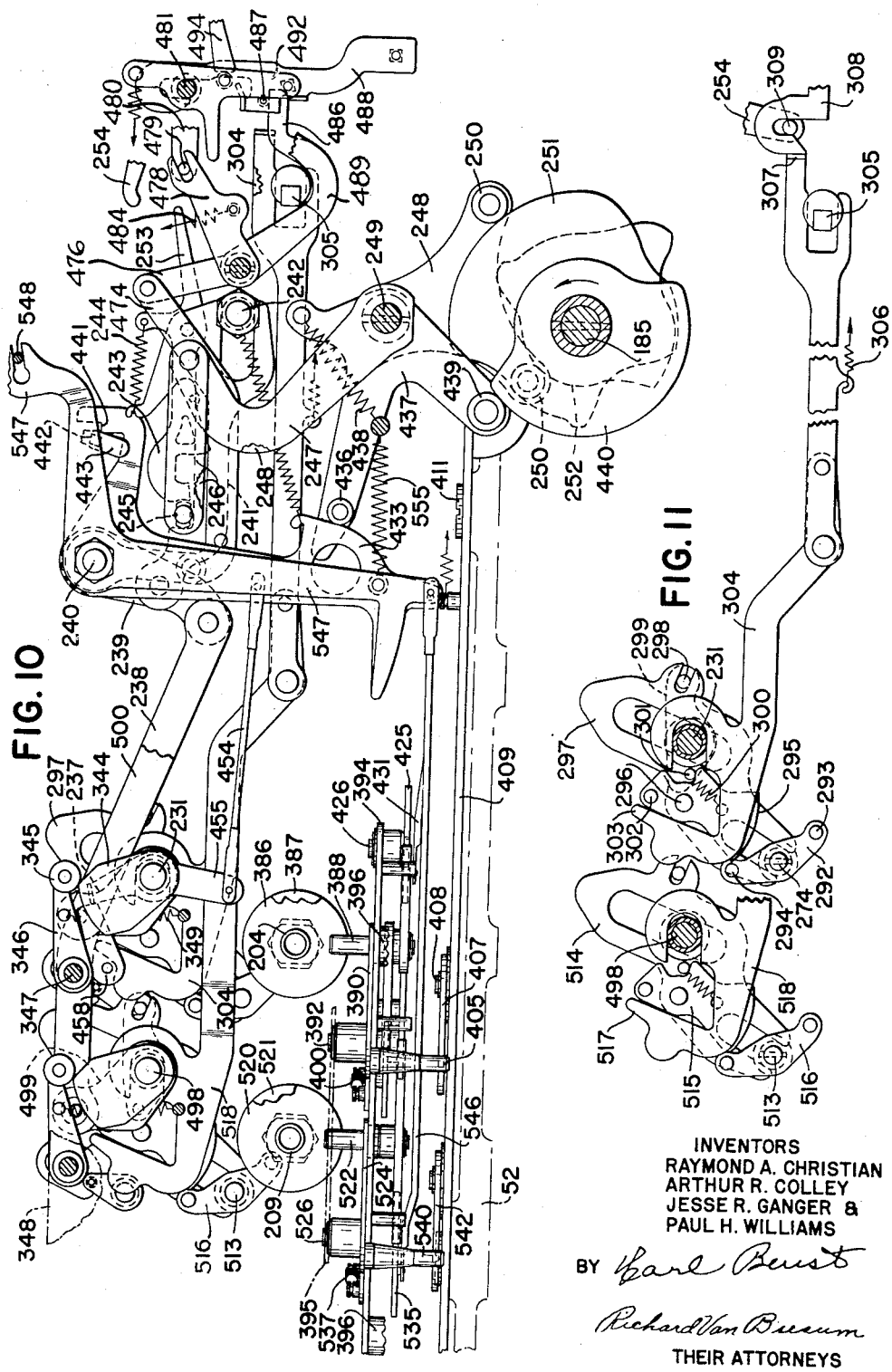
March 29, 1960    R. A. CHRISTIAN ET AL    2,930,523
TOTALIZER CONTROL MECHANISM FOR ACCOUNTING MACHINES
Filed Nov. 2, 1954    11 Sheets-Sheet 6
INVENTORS
RAYMOND A. CHRISTIAN
ARTHUR R. COLLEY
JESSE R. GANGER &
PAUL H. WILLIAMS
BY
THEIR ATTORNEYS March 29, 1960  R. A. CHRISTIAN ET AL  2,930,523
TOTALIZER CONTROL MECHANISM FOR ACCOUNTING MACHINES
Filed Nov. 2, 1954  11 Sheets-Sheet 7
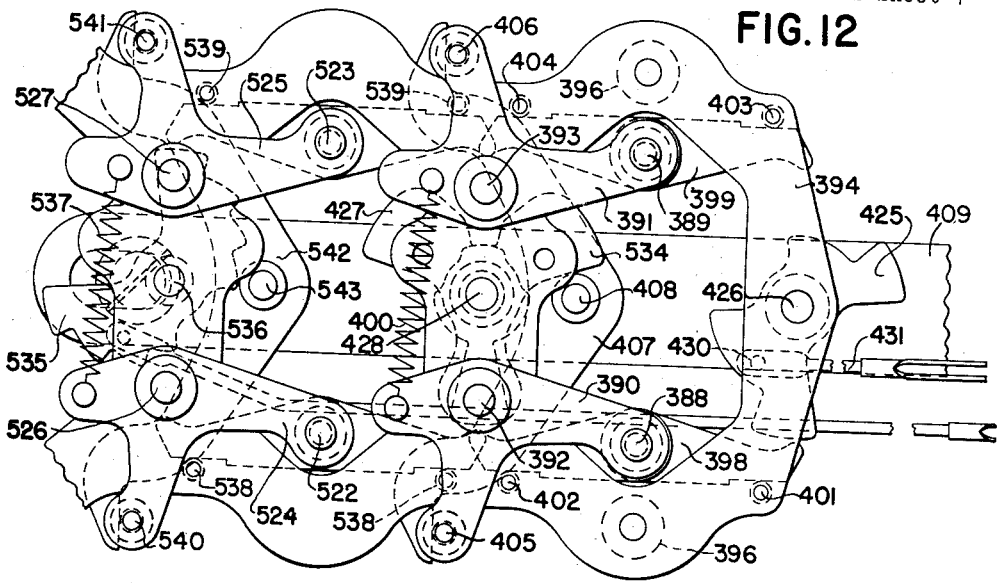
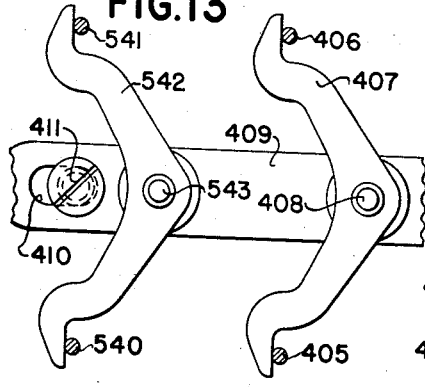
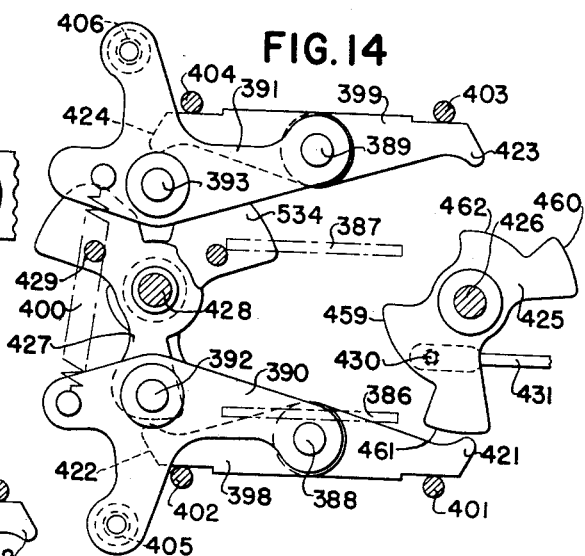
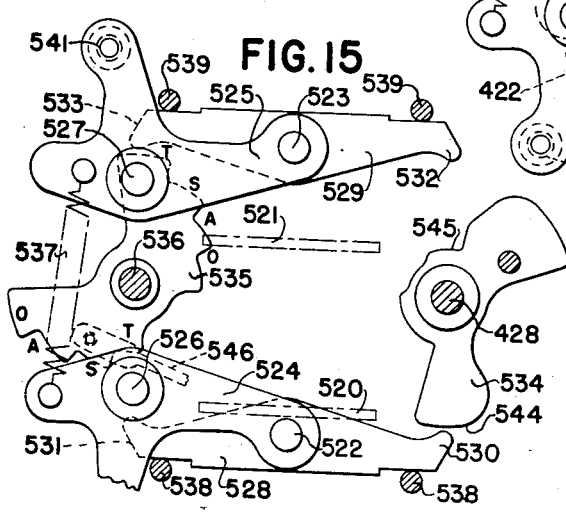
INVENTORS
RAYMOND A. CHRISTIAN
ARTHUR R. COLLEY
JESSE R. GANGER &
PAUL H. WILLIAMS
BY Earl Beust
Richard Van Buren
THEIR ATTORNEYS March 29, 1960  R. A. CHRISTIAN ET AL  2,930,523
TOTALIZER CONTROL MECHANISM FOR ACCOUNTING MACHINES
Filed Nov. 2, 1954    11 Sheets-Sheet 8

INVENTORS
RAYMOND A. CHRISTIAN
ARTHUR R. COLLEY
JESSE R. GANGER &
PAUL H. WILLIAMS
BY
THEIR ATTORNEYS

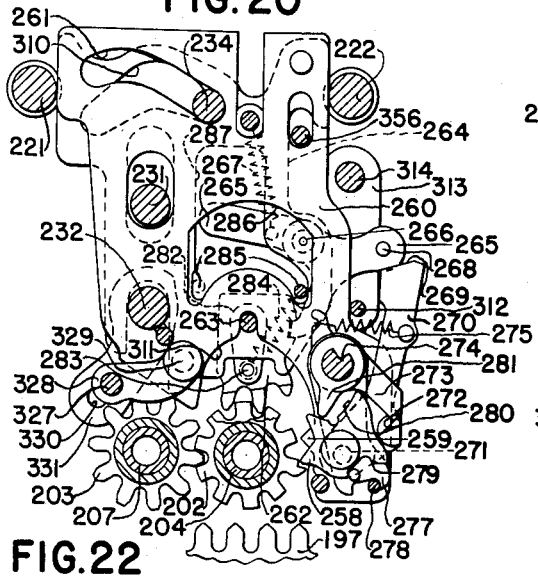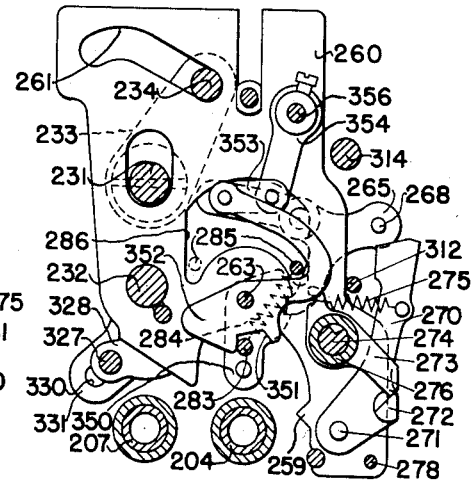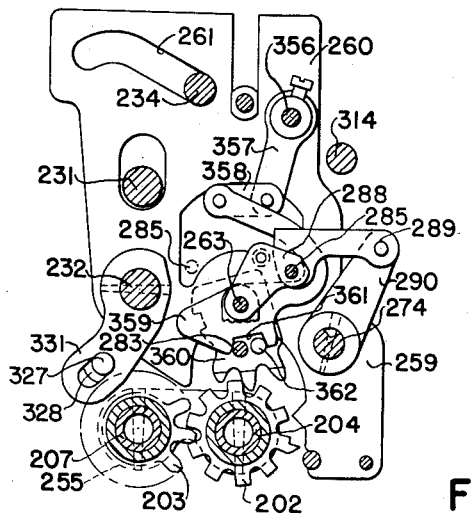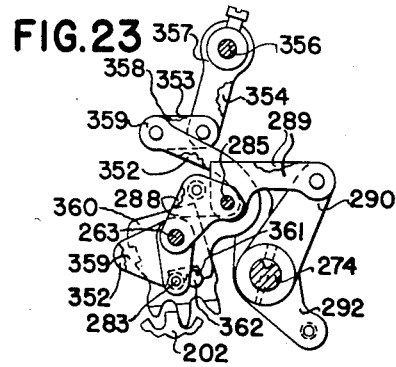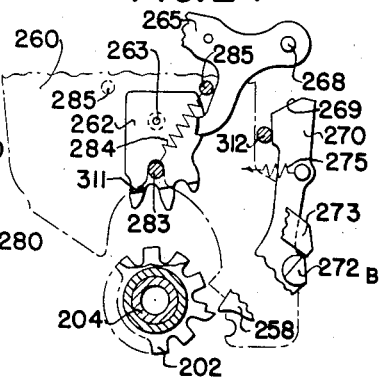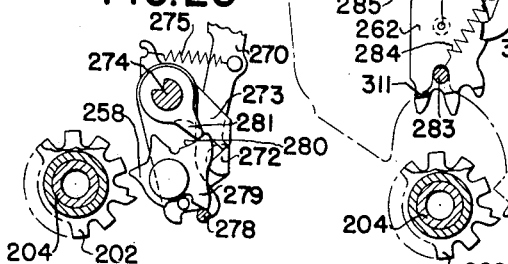
INVENTORS
RAYMOND A. CHRISTIAN
ARTHUR R. COLLEY
JESSE R. GANGER &
PAUL H. WILLIAMS
BY
THEIR ATTORNEYS March 29, 1960  R. A. CHRISTIAN ET AL  2,930,523
TOTALIZER CONTROL MECHANISM FOR ACCOUNTING MACHINES
Filed Nov. 2, 1954  11 Sheets-Sheet 10
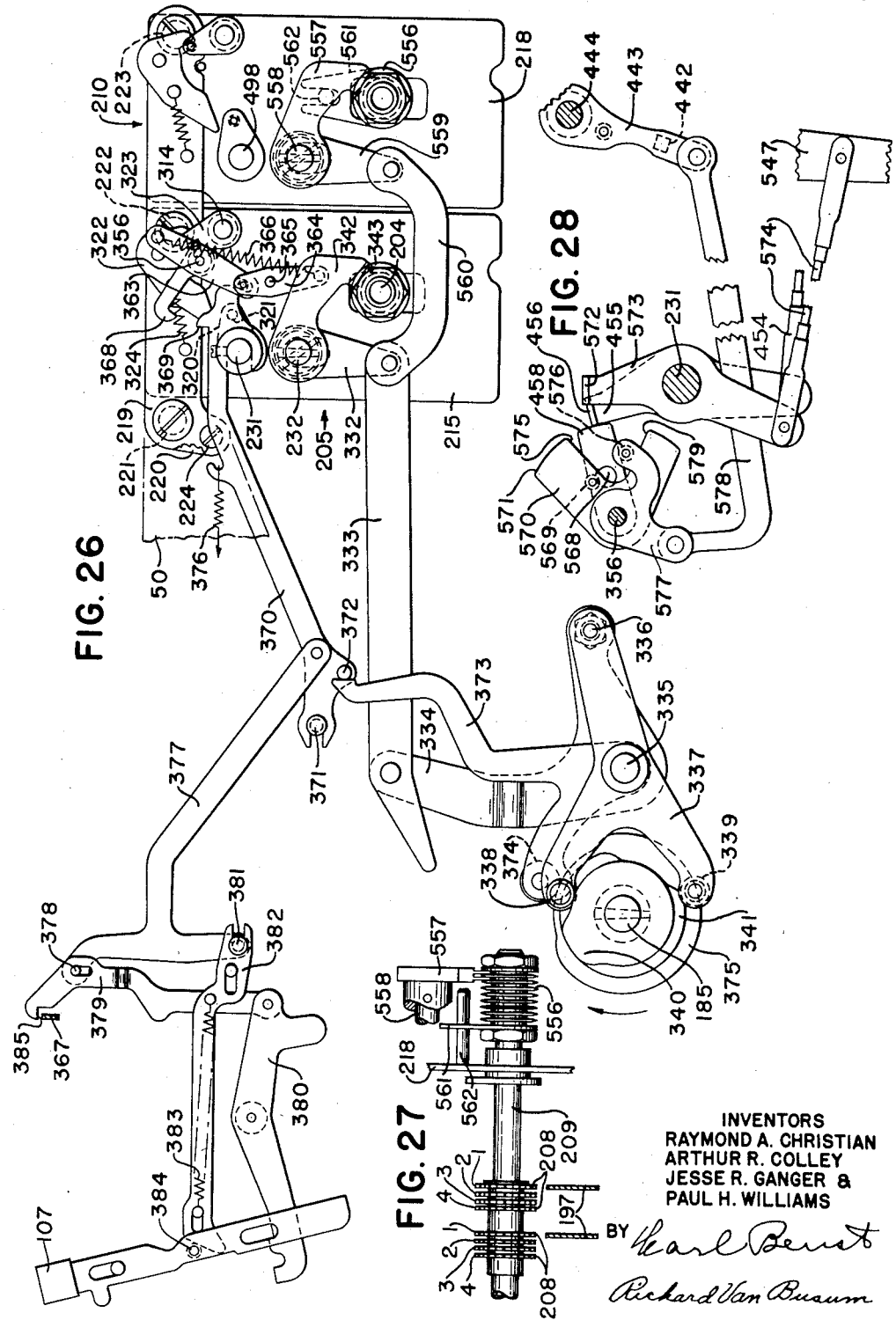
INVENTORS
RAYMOND A. CHRISTIAN
ARTHUR R. COLLEY
JESSE R. GANGER &
PAUL H. WILLIAMS
BY
THEIR ATTORNEYS March 29, 1960 R. A. CHRISTIAN ET AL 2,930,523
TOTALIZER CONTROL MECHANISM FOR ACCOUNTING MACHINES
Filed Nov. 2, 1954 11 Sheets-Sheet 11
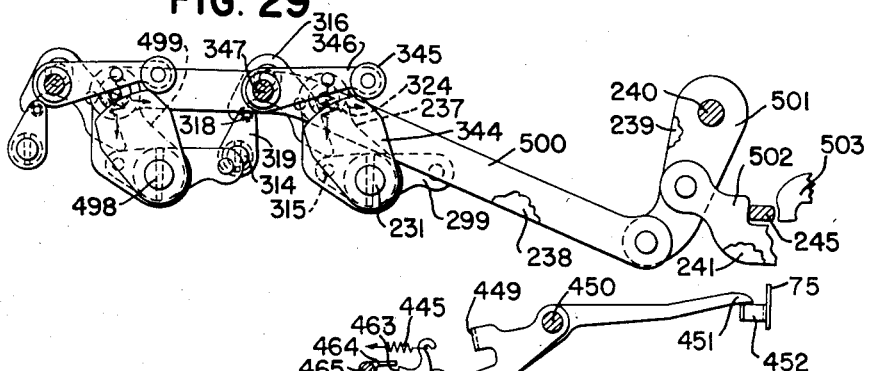
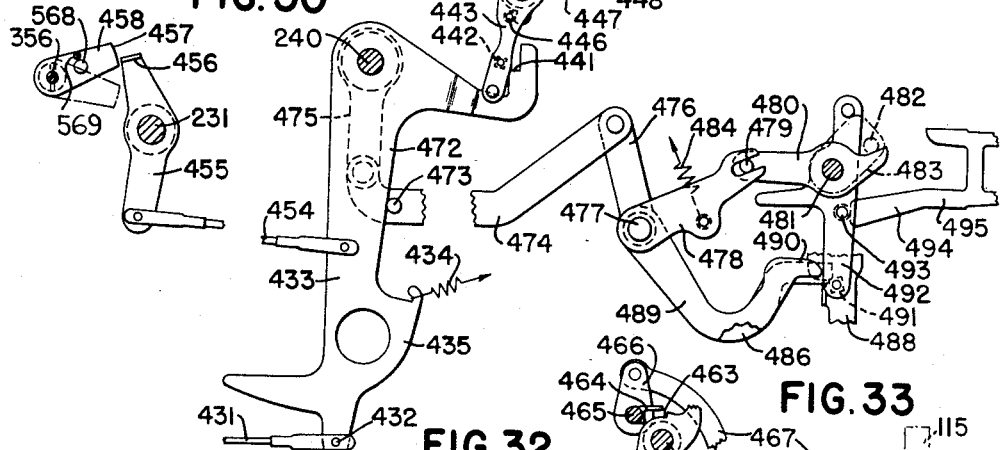
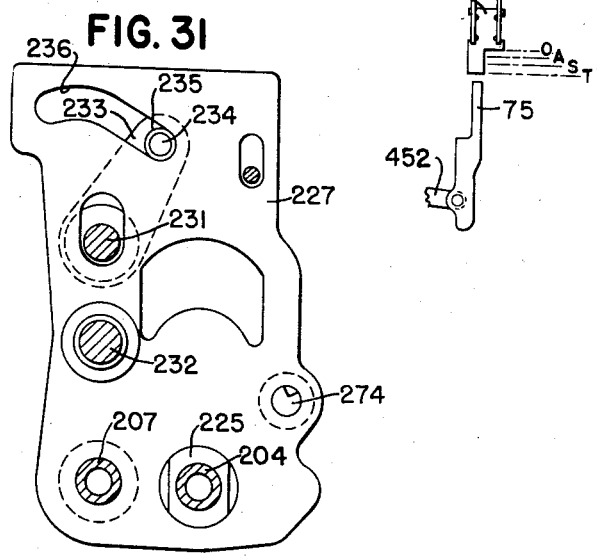
INVENTORS
RAYMOND A. CHRISTIAN
ARTHUR R. COLLEY
JESSE R. GANGER &
PAUL H. WILLIAMS
BY *Kearl Benst*
*Richard Van Busum*
THEIR ATTORNEYS

2,930,523
TOTALIZER CONTROL MECHANISM FOR ACCOUNTING MACHINES

Raymond A. Christian, Arthur R. Colley, Jesse R. Ganger, and Paul H. Williams, Dayton, Ohio, assignors to The National Cash Register Company, Dayton, Ohio, a corporation of Maryland (incorporated in 1926)

Application November 2, 1954, Serial No. 466,292

11 Claims. (Cl. 235—60.2)

The present invention relates to accounting or bookkeeping machines and the like and is particularly directed to the totalizer equipment of such machines.

The machine chosen as a suitable example to illustrate the various features of the present invention is of the same general type as that fully disclosed in Letters Patent of the United States No. 2,626,749, issued January 27, 1953, to Raymond A. Christian et al., and in the present application the standard features of this machine will be described only in a general way, as a full and complete disclosure of this mechanism may be obtained by referring to the above-entitled patent.

The machine disclosed in the above patent may be provided with a maximum of nine add-subtract totalizers and an overdraft or balance totalizer, which is common to all of the other totalizers, said totalizers being arranged in vertical pairs at the rear of the machine. In this arrangement, each totalizer is separate and complete in itself, in that it is provided wtih a separate engaging and disengaging mechanism, and a separate selecting mechanism, both of which may be controlled either by the traveling carriage in preselected columnar positions thereof or by means of corresponding control keys located at the left of the amount keyboard.

This type of structure, while very satisfactory from an operative standpoint, is bulky and cumbersome, and, as totalizers are added, the overhang at the rear of the machine becomes pronounced, and the linkages between the traveling carriage, the control keys, and the corresponding totalizers become extensive and difficult to assemble and adjust, so that from a practical standpoint the totalizer capacity of the machine is confined to a maximum of ten totalizers, including the overdraft totalizer, mentioned above. Therefore, in order to increase the totalizer capacity of the machine, and at the same time reduce the totalizer mass at the rear of the machine, the machine of this invention has been provided with several lines of horizontally-shiftable totalizers, often referred to as interspersed totalizers, each of which lines may contain a maximum of eight totalizers, all eight of which require only about the same amount of space occupied by two vertical pairs of totalizers in the previous machine.

The machine chosen to illustrate the present invention is at present provided with two horizontally-shiftable lines of totalizers, one of which is a balance or overdraft totalizer and is used for the computation of positive and negative amounts, the recording of said amounts, and the simultaneous distribution of said amounts into the various groups of totalizers. In the subject machine, the second line of totalizers contains four sets of interspersed totalizer wheels, which are shiftable horizontally in relation to the amount actuators, so as to be selectively alined therewith under control of the traveling carriage in predetermined columnar positions thereof, or under control of the corresponding control keys. In former machines, it was necessary to provide a tens transfer mechanism for each set of totalizer wheels; however, in the present improved machine, only one tens transfer mechanism is provided for each totalizer line, which may, as previously explained, contain a maximum of eight sets of totalizer wheels.

In the subject machine, the selection and functions of the four sets of totalizers on the group or storage totalizer line may be controlled exclusive by the traveling carriage in preselected columnar positions thereof, with the exception of the total-taking function in said group totalizers, which may be controlled either by the traveling carriage or by suitable control keys. Likewise, the selection of the plus or minus side of the balance totalizer or crossfooter, and the functions performed therein, may be controlled by the traveling carriage in preselected columnar positions thereof. However, a full set of control keys, including add, subtract, and total-taking keys, are provided for the balance totalizer, so that the selection and functions of this totalizer may be controlled by said keys, if desirable or necessary.

While the subject machine is disclosed with only two lines of interspersed totalizers, the machine embodies provisions for a third line of interspersed totalizers, with a maximum of eight sets of totalizer wheels thereon.

With the above outline in mind, it is a general object of this invention to provide an accounting machine with a plurality of totalizer lines, one or more of which may support a plurality of sets of add-subtract totalizers, and one or more of which may support a balance totalizer or crossfooter, for use in computing totals to be entered in the other sets of totalizers, said lines being shiftable horizontally to aline the selected sets of totalizer wheels with the single set of amount actuators, and shiftable vertically to engage and disengage the selected sets totalizer wheels and the actuators in proper timing for the type of operation being performed.

Another object is to provide means to impart horizontal shifting movement to the totalizer lines to aline the different sets of totalizer wheels thereon with the single set of amount actuators.

Still another object is to provide means controlled by the traveling carriage in preselected columnar positions thereof, or by the totalizer control keys, to the control the operation of the horizontal shifting means to aline the selected set of totalizer wheels with the amount actuators.

A further object is the provision of means to impart vertical shifting movement to the totalizer lines to engage and disengage the selected sets of totalizer wheels and the actuators in proper timing for the type of operation being performed.

A still further object is to provide means controlled by the traveling carriage in preselected columnar positions, or by the totalizer control keys, to control the operation of the vertical shifting means to cause the selected totalizer to be engaged with and disengaged from the amount actuators in proper timing for the type of operation being performed.

A further object is the provision of improved means controlled by the balance totalizer or crossfooter to automatically select a particular totalizer on the group totalizer line to receive the balance taken from said crossfooter.

Still another object is the provision of means controlled by the algebraic condition of the crossfooter to automatically select a corresponding totalizer on the group totalizer line to receive the positive or negative amount cleared therefrom.

A further object of the present invention is the provision of means controlled by the algebraic condition of the crossfooter to automatically select a certain totalizer on the group totalizer line to receive plus balances and to automatically select another totalizer on the group totalizer line to receive minus balances.

A still further object is the provision of means operating under control of the algebraic condition of the crossfooter to control the color shift of the inking ribbon so that negative balances will be printed in a distinctive color for immediate and ready identification thereof.

A further object is to provide means under control of the algebraic condition of the crossfooter to prevent automatic release of the machine for operation when said crossfooter is in an overdrawn or negative condition.

With these and incidental objects in view, the invention includes certain novel features of construction and combinations of parts, a preferred form or embodiment of which is hereinafter described with reference to the drawings which accompany and form a part of this specification.

In the drawings:

Fig. 1 is a perspective view of the machine of this invention.

Fig. 2 is a diagrammatic view of the keyboard of the machine of the instant invention.

Fig. 3 is a front elevation of a part of the carriage-controlled mechanism for selecting the group totalizers.

Fig. 4 is a detail view of a part of the mechanism shown in Fig. 10 for selecting the group totalizers.

Figs. 5-A and 5-B together constitute a cross-sectional view of the machine as observed from the right, taken just to the right of one of the amount banks.

Fig. 6 is a detail view of the latch mechanism for disconnecting the key-stop portion of the amount actuators from the rearward or actuating portion of said actuators in total-taking operations.

Fig. 7 is a side-spacing view, as observed from the front of the machine, of the balance totalizer or crossfooter.

Fig. 8 is a detail view of the mechanism for imparting horizontal shifting or selecting movement to the totalizer lines.

Fig. 9 is a detail view of the anti-rebound device for the shiftable totalizer lines.

Fig. 10 is a right side elevation of the mechanism for imparting horizontal selecting movement to the totalizer lines.

Fig. 11 is a detail view of the mechanism for shifting the tens transfer mechanism from add to subtract position, and vice versa.

Fig. 12 is an enlarged plan view of a portion of the mechanism for imparting horizontal shifting or selecting movement to the totalizer lines.

Fig. 13 is a detail view of the yokes for imparting horizontal shifting movement to the totalizer lines.

Fig. 14 is a plan view of the mechanism for controlling horizontal shifting movement of the crossfooter line.

Fig. 15 is a detail plan view of the mechanism for controlling horizontal shifting movement of the group totalizer line.

Figure 16:
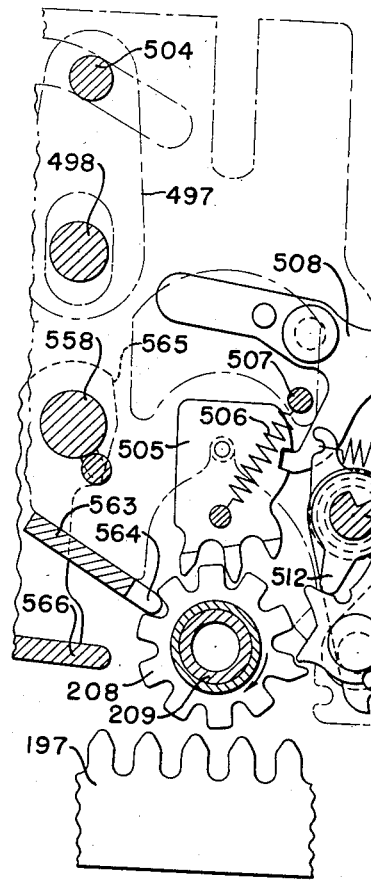

Fig. 16 is a cross-sectional view of the group totalizer line, showing said totalizer line in partially-engaged condition.

Figure 17:
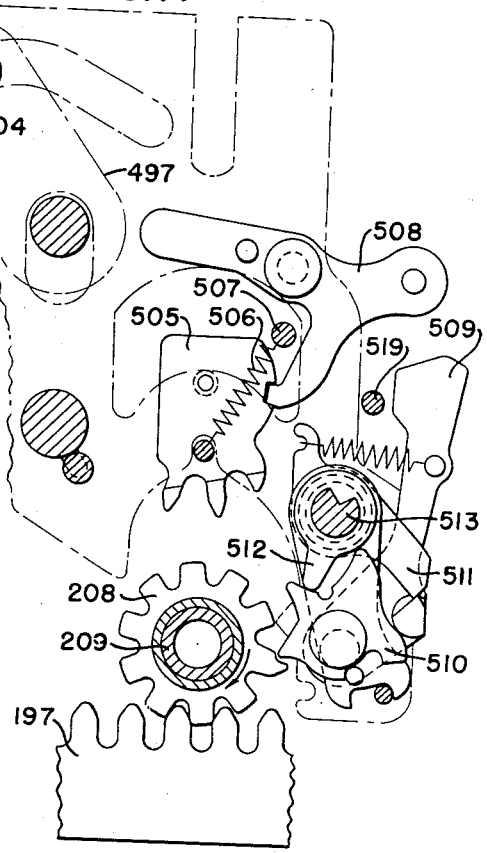

Fig. 17 is a cross-sectional view of the group totalizer line, showing the selected set of totalizer wheels in fully-engaged condition.

Figure 18:
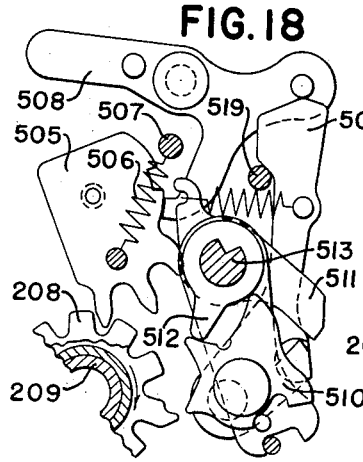

Fig. 18 is a detail view showing the functioning of the tens transfer mechanism in adding operations.

Figure 19:
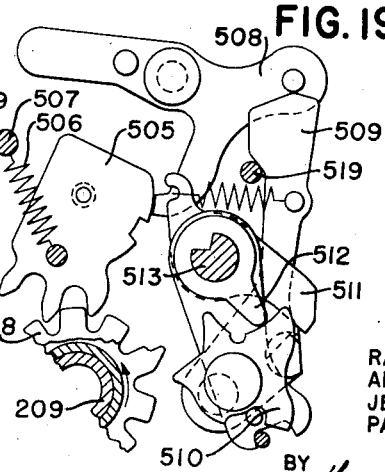

Fig. 19 is a detail view showing the functioning of the tens transfer mechanism in subtracting operations.

Fig. 20 is a cross-sectional view of the crossfooter or balance totalizer, taken along line 20—20 (Fig. 7), looking in the direction indicated by the arrows.

Fig. 21 is a cross-sectional view of the balance totalizer taken along line 21—21 (Fig. 7), looking in the direction indicated by the arrows, showing a portion of the "fugitive 1" mechanism.

Fig. 22 is a cross-sectional view of the balance totalizer taken along line 22—22 (Fig. 7), looking in the direction indicated by the arrows.

Fig. 23 is a detail view showing in particular a portion of the "fugitive 1" mechanism for the balance totalizer.

Fig. 24 is a detail view of the tens transfer mechanism for the balance totalizer after being tripped, in add operations.

Fig. 25 is a detail view of the tens transfer mechanism for the balance totalizer prior to being tripped in subtract operations.

Fig. 26 is a side elevation as observed from the right of the machine, showing the aliner mechanism for the two horizontally-shiftable totalizer lines, the tens transfer restoring mechanism, and the mechanism controlled by the algebraic condition of the balance totalizer for preventing automatic release of the machine for operation when said totalizer is in a negative or overdrawn condition.

Fig. 27 is a fragmentary view of one end of the group totalizer line.

Fig. 28 is a left side elevation of a part of the mechanism for selecting a particular group totalizer to receive the total of an overdraft taken from the balance totalizer.

Fig. 29 is a detail view of the mechanism for yieldably retaining the totalizer lines in either engaged or disengaged position, and the tens transfer restoring mechanism.

Fig. 30 is a left side elevation of the mechanism for controlling total-taking operations in the balance totalizer.

Fig. 31 is a detail view of one of the shiftable support plates for the balance totalizer shaft.

Fig. 32 is a detail view of a part of the sensing mechanism shown in Figs. 3 and 4.

Fig. 33 is a detail view of a portion of the control mechanism for the balance totalizer.

GENERAL DESCRIPTION

As previously explained, substantially all of the main features of the machine, with the exception of the totalizer equipment, are fully disclosed in the United States Patent No. 2,626,749, to Raymond A. Christian et al., and the ones of these features which are not pertinent to the present invention will be described herein only in a general way, as reference may be had to the patent mentioned above for a more complete description of this mechanism.

Like its predecessor, the present machine is provided with a laterally-shiftable carriage, which may be tabulated in either direction from one columnar position to another, or, if required, through intervening columnar positions from one columnar position to a preselected columnar position, all of which is made practical by means of the well-known fluid coupling mechanism which connects the traveling carriage to its driving means. In adidtion to the usual method of winding record material around the platen roll from its rear, the present machine is provided with a front feed mechanism which opens and closes a throat located at the front of the platen for the insertion and removal of record material, such as ledger cards and statements, at the front of said platen instead of at the rear.

The instant machine is provided with a full complement of amount keys, which control the positioning of corresponding differential actuator mechanisms, which in turn control the setting of corresponding type carriers for recording the values of the effective amount keys upon the record material supported by the traveling carriage platen, and said actuators also control the entering of said values, either positively or negatively, into the wheels of the selected totalizers. The machine is also provided with a full complement of date keys, located to the left of the amount keys, for setting up the date, which likewise is printed on the record material supported by the traveling carriage platen.

The machine is equipped with a continuously-operating motor, which drives the fluid coupling mechanism for shifting the traveling carriage in either tabulating or return direction, and which, through a clutch mechanism controlled by depressible release or starting bars located at the right of the keyboard, may be connected to the machine mechanism for driving said machine through the single cycle of operation required for all types of functions performed by the machine. In other words, it is to be understood that all functions of the machine, including non-adding, adding, subtracting, and positive and negative total-taking, are effected in a single cycle of machine operation. This is a decided improvement over many machines of this type, which require plural cycles of operation, for example, to effect positive and negative total-taking functions. In addition to the manual initiation of machine operation by use of the starting bars referred to before, machine operations may be automatically initiated through the medium of the traveling carriage in preselected columnar positions thereof, with the single exception of overdraft total-taking or credit balance operations, which must be initiated by use of the manually-operable release bars, as an overdraft in the crossfooter renders the automatic machine-releasing mechanism inoperative. Unlike the machine disclosed in the Christian et al. patent referred to above, the present machine is not provided with the well-known electric typewriter mechanism for typing data of a descriptive or other nature upon the record material supported by the traveling carriage platen. However, this is a matter of choice, and the machine may be readily provided with the electric typewriter, if this is a requisite of the business system to which said machine is being applied.

As at present constructed, the machine chosen to illustrate the present invention is provided with two shiftable totalizer lines, located at the rear thereof, one of said lines supporting a crossfooter or balance totalizer for the computation of positive and negative amounts, and the other of said lines supporting a maximum of eight individual sets of interspersed totalizer wheels to provide eight individual group or storage totalizers, which may be selected and conditioned for actuation by the single set of amount actuators by means of stops located on the front of the traveling carriage in predetermined columnar position thereof, or by corresponding control keys. Likewise, the functions of the group or storage totalizers may be controlled by means of the traveling carriage in predetermined columnar positions thereof, with the exception of the total-taking functions in said totalizers, which may be controlled either by the traveling carriage or by means of corresponding control keys located to the left of the keyboard. The functions referred to above in the group totalizers are non-adding, adding, subtracting, and total and sub-total taking operations. A single transfer mechanism, which is common to all of the eight sets of totalizer wheels, is provided for transferring tens digits from one denomination to another in adding and subtracting operations. Shifting the selected sets of storage or group totalizer wheels into alinement with the amount actuators likewise shifts said wheels into coacting relationship with the tens transfer mechanism.

The terms "overdraft totalizer," "balance totalizer," and "crossfooter" are considered synonymous and will be used interchangeably throughout the description, and this also applies to the terms "storage totalizers" and "group totalizers."

The crossfooter or balance totalizer comprises a single set of add-subtract wheels, which coact with the amount actuators in adding and subtracting operations to enter positive and negative amounts in said balance totalizer. Each balance totalizer wheel is geared to a corresponding auxiliary or storage wheel, which is always in complementary relationship thereto, and which, in overdraft total-taking operations only, is alined with and coacts with the amount actuators to control the positioning of said actuators and their corresponding printing segments to cause a true negative amount of the overdraft to be printed on the record material. In other words, all functions of the balance totalizer, including adding, subtracting, and positive total-taking operations, are effected by engagement of the main wheels of said totalizer with the amount actuators. However, the occurrence of an overdraft in the crossfooter sets up a condition which causes the auxiliary or storage totalizer wheels to be engaged with the amount actuators in total-taking operations only, so that a true negative amount of the overdraft will be recorded. Naturally, after an overdraft occurs in the balance totalizer, add and subtract operations may be continued therein as long as desired, and if during these operations the crossfooter changes from an overdraft, or negative, condition to a positive condition, the conditions referred to above will be reversed, so that the main wheels will again be alined with and coact with the amount actuators in total-taking operations.

The above-referred-to automatic shifting of the crossfooter line to aline either the main wheels or their corresponding auxiliary storage wheels with the amount actuators is controlled by the "fugitive 1" mechanism, which is necessary in a crossfooter of this type to correct the units or lowest order wheel when the highest order wheel passes through zero while revolving in either a positive or a negative direction.

As previously mentioned, the machine is provided with automatic releasing mechanism, which may be operated by the traveling carriage in preselected columnar positions thereof to initiate automatic machine operation. The occurrence of an overdraft in the crossfooter causes the automatic releasing mechanism to be rendered inoperative, to apprise the operator of the fact that an overdraft exists, and, as long as said crossfooter is in an overdrawn condition, machine operation cannot be initiated automatically by means of the traveling carriage but must be initiated by means of the manually-operable releasing or starting bars, located to the right of the amount keyboard. However, if during subsequent operations the crossfooter changes from an overdrawn condition to a positive condition, the automatic machine-releasing mechanism will again be rendered operative.

The basic features of the overdraft and storage totalizers, explained in a general way above, are fully disclosed in United States Patent No. 2,503,865, issued April 11, 1950, to Raymond A. Christian, to which reference may be had for a detailed description of mechanism which is not pertinent to the present invention and which for that reason will be described only in a general way herein.

The mechanism for shifting the balance and group totalizer lines longitudinally to aline the selected sets of wheels thereon with the amount actuators, the mechanism for engaging and disengaging the selected totalizers and the actuators, and the controlling means for these mechanisms contain many unusual features, which will be described in detail in the following pages.

DETAILED DESCRIPTION

Framework and Operating Mechanism

The main mechanisms of the machine, including the keyboard mechanism, the actuator mechanism, the printing mechanism, and the traveling carriage, are supported by and between right and left main frames 50 and 51 (Figs. 5–B and 7), said frames in turn being secured to a machine base 52. The base 52, in cooperation with various cross frames, bars, and rods, supports and maintains the two main frames 50 and 51 in proper parallel spaced relationship to each other. The mechanism of the machine is enclosed in a suitable case or cabinet 53 (Fig. 1), which is fabricated in several parts or sections so as to give quick and ready access to different portions or units of the machine, said case being secured to the machine framework and to the base.

The machine is provided with a laterally-shiftable traveling carriage 54 (Figs. 1, 5–A, and 5B), comprising right and left end frames or housings, connected at the rear by a Z-shaped bracket 55 and a bottom plate 56, and connected at the front by means of a horizontal bar 57 secured at opposite ends to two angular brackets 58 (only one shown here), said brackets in turn being secured to the corresponding end frames of the carriage. The traveling carriage 54 is shiftably supported on the machine by means of a tubular rail 59, secured to the bottom plate 56 and riding on five rollers 60, in turn rotatably mounted on a bar 61 secured to the main frames 50 and 51. The rail 59 is retained in accurate engagement with the rollers 60 by several angular rollers 62 located on either side thereof, some of said rollers being mounted directly on the upper edge of the bar 61, and the remainder of said rollers being mounted on studs in turn secured in said bar 61. The front edge of the traveling carriage is shiftably supported by means of a longitudinal channel in the bar 57, which engages a plurality of rollers 63 mounted on a plate 64 in turn secured to the machine framework. Secured to the lower portion of the bracket 55 (Fig. 5–B) is a longitudinal rack 65, the teeth of which mesh with a gear 66 secured on the upper end of a vertical shaft 67, journaled at its upper end in a plate 68 secured to the bar 61, and at its lower end in the top portion of a fluid drive housing 71, secured to the machine base 52. Secured on the lower end of the shaft 67 is a wide-faced gear 69, which meshes with a shiftable reversing gear 70 journaled in the housing 71. The gear 70 is connectable to either of two reversibly-driven gears (not shown), which are in turn non-positively operated by means of the fluid drive mechanism. When the gear 70 is in its upper position, as shown here, it drives the shaft 67 and the traveling carriage in a left-hand or tabulating direction, and, when said gear 70 is shifted downwardly, it drives said shaft 67 and the traveling carriage in a right-hand or return tabulating direction. The fluid drive mechanism for shifting the traveling carriage in tabulating and return direction is operated by means of a continuously-running electric motor (not shown), which is secured to the machine base 52 and which also operates the accounting machine mechanism.

The tabulating movements in both forward and return directions, are controlled by means of an escapement mechanism (not shown), which engages teeth on the lower edge of the bar 57 (Figs. 1 and 5–A), said escapement mechanism being controllable either manually, by means of the starting bars and other control keys, or automatically, by means of the traveling carriage in preselected columnar positions thereof, as will be explained more at length later.

Removably attached to the bar 57 is a stop bar 72 (Figs. 1 and 5–A), having adjustably mounted thereon a plurality of stops 73 located in preselected columnar positions of the traveling carriage, said stops carrying control plates 74, which coact with sensing fingers 75 to control the various functions of the machine. The stops 73 likewise may be provided with forward and return tabulating lugs, which control the forward and return tabulating movements of the traveling carriage to locate said carriage in preselected columnar positions while traveling in either direction, a lug for unlocking the machine-releasing mechanism, and, if desired, a lug for automatically initiating machine operation. The bar 72, with its assembly of control stops 73, may be readily removed from the machine and replaced with another bar having other stops located in different columnar positions, and with a different arrangement of the control plates 74 and the other control lugs, for quickly adapting the machine for use in connection with a different business system. Likewise the stops 73 may be quickly adjusted to any position on the bar 72, to readily arrange the columnar positions of the traveling carriage to agree with the divisions of different types of record material.

Rotatably mounted in the traveling carriage framework 54 is a platen roll 76 (Figs. 1, 5–A, and 5–B) for supporting record material, such as a journal sheet 77, in printing position, said journal sheet in this instance being unwound from a supply roll 78, supported by the traveling carriage, and fed beneath and around said platen roll 76 from the rear. The journal sheet 77 is retained in feeding engagement with the face of the platen roll by means of rear pressure rollers 79 and front pressure rollers 80. In addition to back-fed record material, such as the journal sheet 77, explained above, the machine is provided with a front feed throat for guiding record material, such as ledger cards 81 (Figs. 5–A and 5–B), around the front of the platen roll and into printing position. The front feed throat includes a rockable front feed guide 82, which, when in closed throat position, as shown in full lines in Fig. 5–A, retains the front fed record material 81 in printing position around the platen roll 76. The front feed guide 82 is movable from closed position to open position, as indicated in dot-and-dash lines (Fig. 5–A), and during such movement the front pressure rollers 80 are moved out of engagement with the face of the platen roll and, in conjunction with said guide 82, form a front-feed throat which directs the ledger card 81 around the front of the platen and into a guide chute 83, located at the rear of the traveling carriage. The lower edge of the guide 82 forms a line guide for use in locating the desired line of the record material in proper printing relationship to the type carriers. The front pressure rollers 80 and the guide 82 are moved from closed to open throat position and vice versa through the medium of mechanism comprising a tube 84 (Fig. 5–B), journaled in the carriage framework and connected by a plurality of pins to a rod 85, which slides between parallel faces of two blocks 86 pivotally mounted on a plate 87, which is shifted from one position to another, to operate the front feed throat through the medium of a clutch (not shown) which connects said plate 87 to the continuously-running motor.

Either front-fed or back-fed record material supported by the platen roll 76 may be line-spaced by rotation of said platen roll in a clockwise direction (Figs. 5–A and 5–B) through the medium of mechanism comprising a tube 88 journaled in the carriage framework and connected by pins 89 to a rod 90, which is maintained in yielding engagement with an operating roller 91 mounted on an arm 92 secured on the upper end of a vertical shaft 93 journaled in the plate 68 and in the base 52. The lower end of the shaft 93 is connected through a linkage to a clutch mechanism (not shown) for clutching said shaft to the continuously-running motor. The clutches for the front feed throat and the line-spacing mechanism may be operated manually by means of the machine release bars or by means of corresponding control keys, or they may be operated automatically by means of the traveling carriage in preselected columnar positions thereof, to open or close the frontfeed throat and to rotate the platen roll to line-space the record material supported thereby.

The above-given general description of the traveling carriage mechanism is believed to be adequate for the present purpose. However, this mechanism is fully disclosed in the United States Patent No. 2,626,749, referred to above, which may be consulted for a more detailed description of this mechanism, if desired.

Keyboard

The amount keyboard comprises a complete unit 96 (Figs. 1, 2, and 5–A), containing a plurality of denominational rows of amount keys 97, a complete complement of date keys 98, symbol keys 99, and a Tabulating key 103, which unit may be placed in or removed from the machine in its entirety. The date keys 98 are normally stay-down keys, in that they are not released at the end of each machine operation. However, a Non-Repeat key 110 is provided for said date keys and, upon depression, causes said keys to be automatically released near the end of machine operation, so that the printing of the date will not be repeated in succeeding operations. Likewise, a Release key 109 is provided for releasing all the depressed date keys, except the year keys, when the machine is at rest. The symbol-printing keys 99 are in the same row as the year date keys and may be used to print symbols for identification purposes upon the record material adjacent the amounts. The amount keys 97 are of flexible construction, whereby the depression of one key in a particular denomination releases any previously-depressed key in said denomination, and so on.

The machine keyboard also includes a Vertical release bar 100, a Main release bar 101, and a Skip release bar 102, located to the right of the amount keys 97, said release bars being manually depressible to initiate operation of the machine. In addition to releasing the machine for operation, the Vertical bar 100 likewise causes the platen roll to be rotated to line-space the record material supported thereby. Operation of the Main motor bar 101 normally causes the traveling carriage to be tabulated from one columnar position to the next, and operation of the Skip bar 102, in addition to initiating machine operation, also causes the traveling carriage to be skip-tabulated from one columnar position through intervening columnar positions to a preselected columnar position.

A lever 108 (Fig. 1), which protrudes through a hole in the keyboard plate, is positionable in three positions to control the operation and functions of the Main motor bar 101. When the lever 108 is in its upper position, as shown here, the Main motor bar 101 functions normally to initiate machine operation and to release the traveling carriage 54 for tabulating movement from one columnar position to the next. When the lever 108 is in its central position, the tabulating function of the Main motor bar 101 is rendered inoperative, and consequently said motor bar initiates machine operation only. When the control lever 108 is in its third, or lower, position, the Main motor bar 101, in addition to initiating machine operations, also renders the platen-rotating mechanism operative to line-space the record material wound around the platen roll.

The release bars 100, 101, and 102 (Fig. 1) have two stages of depression, often referred to as "touch" and "hold," and function in the manner explained above upon normal or "touch" depression. In "touch" depression, pressure is immediately released from the release bars 100, 101, and 102 the instant they are depressed, and in "hold" depression, pressure is retained on said bars after they have been depressed, and they are thereby rendered operative to control different functions of the machine from those controlled by said bars when they are "touch" depressed. In the present machine, "hold" depression of the Vertical bar 100 does not change the functions of said bar, and consequently it operates as explained in connection with normal, or "touch," depression above. "Hold" depression of the Main motor bar 101, with the lever 108 in its upper position, causes the traveling carriage to be tabulated in a return direction and also causes the platen to be line-spaced. "Full" or "hold" depression of the Skip release bar 102 does not alter the function of this bar in this present arrangement, and consequently it functions in the manner explained in connection with normal, or "touch" depression.

With the control lever 108 in central position, "hold" depression of the Main motor bar 101 causes the platen line-spacing mechanism to function, whereas it will be recalled that in this case normal or "touch" depression of said Main motor bar serves only to initiate machine operation. With the lever 108 in its third, or lower, position, full or "hold" depression of the Main motor bar 101 does not alter the normal function of said motor bar, and consequently in this case the line-spacing mechanism for the platen roll is rendered operative. Full, or "hold," depression of the Skip tabulating bar 102 alters the control of said Skip bar over the tabulating mechanism to cause the traveling carriage to skip-tabulate from one columnar position through several columnar positions to a different columnar position from that selected by normal, or "touch," depression of said Skip bar. In the present machine, the lever 108 controls only the Main motor bar 101 and has no effect upon the Vertical bar 100 and the Skip bar 102.

The traveling carriage may be manually released for forward tabulating movement by depression of the Tabulating key 103 (Figs. 1 and 2), which functions to cause said traveling carriage to tabulate from one columnar position to the next. Likewise, the reverse or return tabulating movement of the traveling carriage may be controlled by a Reverse Tabulating key 104, depression of which causes the traveling carriage to be tabulated in a reverse direction from one columnar position to the next. Likewise, a Carriage Release key 105 is provided for releasing the traveling carriage escapement mechanism, so that the traveling carriage may be moved in either direction as long as said key 105 is retained in depressed position. The machine is also provided with a Throat Key 106 (Figs. 1 and 2), depression of which causes the front feed throat to be opened or closed, depending upon which position it is in when said key is depressed. As previously explained, the machine may be automatically released for operation by the traveling carriage in preselected columnar positions thereof, and this feature may be rendered inoperative by depression of a Non-Auto key 107. The key 107 is a stay-down key; that is, not released automatically at the end of machine operation, and renders said automatic releasing mechanism inoperative so long as it is in depressed condition. A Release key 112, located immediately below the Non-Auto key 107, is provided for releasing said key when desirable. The functions of the machine may be further controlled by control surfaces on four positionable slides (not shown), which are positioned under control of the release bars 100, 101, and 102, or under control of the traveling carriage in preselected columnar positions thereof. The slides may be mutilated in the proper fashion so as to form the required control surfaces to obtain the results necessary in connection with the business system to which the machine is being applied.

A Release key 111 is provided for manually releasing the depressed amount keys 97 and the symbol keys 99 at any time when the machine is at rest. When the date Non-Repeat key 110 is depressed, the Release key 111 also functions to release any depressed date keys 98 when the machine is at rest.

The keyboard of the instant machine also includes a full complement of control keys for controlling the functions in the balance totalizer, and these keys include an Add key 113 (Figs. 1 and 2), a Subtract key 114, and a Total key 115, which when used alone causes the balance totalizer to be reset or totalized, and when used in conjunction with a Sub-Total key 116 causes said balance totalizer to be read or sub-totalized. A manually-operable latch 117 is provided for latching the Add key 113 in depressed condition, so that this key in effect may be used as a stay-down key. A Total key 118 is provided for conditioning any selected totalizer on the group totalizer line for a resetting or total-taking operation and, like the Total key 115 for the balance totalizer, may be used in conjunction with the Sub-total key 116 to condition any selected group totalizer for a reading or sub-total-taking operation. The keyboard also includes a Non-Select key 119, depression of which renders the traveling carriage controlled mechanism ineffective for selecting and conditioning the various totalizers for different functions. A manually-operable lever 120 is provided for locking the Non-Select key 119 in depressed condition, so that it will not be automatically released at the end of machine operation. A Reverse key 121 is provided for reversing the adding and subtracting functions in both the balance totalizer and the group totalizers for the purpose of making corrections, and for other uses. This key is effective only when the selection and functions of the various totalizers are being controlled by the traveling carriage and therefore is not effective when said functions are being controlled by the control keys 113 to 116 inclusive, and by the control key 118.

Amount differential mechanism

The amount key bank, shown in Figs. 5–A and 5–B, and its associated differential mechanism will be described as representative of all the amount banks, as these banks are similar in construction and function in exactly the same manner.

The amount keys 97 for the amount bank shown in Fig. 5–A are supported for vertical sliding movement on a corresponding partition plate 124, which forms a part of the keyboard framework. Compressible springs urge the amount keys 97 upwardly to normally retain said keys in undepressed position, as shown here. Each of the amount keys 97 has a pin 125 in its stem, which co-operates with the corresponding camming surface in an opening in a control plate 126. The pins 125 have flattened upper surfaces, which coact with angular noses formed on corresponding extensions on a flexible detent 127, said angular noses terminating in latching shoulders which, in cooperation with the flattened upper surfaces, retain said keys in depressed position. The pins 125 likewise have flattened surfaces on their bottoms, which coact with corresponding locking teeth formed in openings in a locking detent 128, said detent 128, the control plate 126 and the flexible detent 127 being mounted for horizontal sliding movement on the partition plate 124, in the usual manner. A spring 129, tensioned between the control plate 126 and the flexible detent 127, urges said parts rearwardly and forwardly, respectively, to normally maintain the angular camming surfaces in the openings in said control plate 126 in yielding engagement with the corresponding pins 125, and to normally maintain the corresponding angular camming noses on the extensions of the flexible detent 127 in yielding contact with said pins 125.

Depression of one of the amount keys 97 causes the pin 125 therein, in cooperation with the angular nose on the corresponding extension, to shift the flexible detent 127 rearwardly against the action of the spring 129, and, after the flat upper surface of said pin passes beyond the shoulder on said extension, the spring 129 returns said detent a slight distance forwardly to latch the shoulder over said flat surface to retain said key 97 in depressed position. Depression of another amount key 97 after one key has already been depressed causes the pin in said latter depressed key to shift the detent rearwardly to release the formerly depressed key to provide what is termed in this art as "flexible key bank construction." The locking detent 128 has an upward extension 130 with a rounded nose, which is maintained in yielding contact with an operating projection 131, secured on a key lock shaft 132 journaled in the keyboard framework, by a spring 133 tensioned between said extension and said projection.

At the beginning of machine operation, counter-clockwise movement of the key lock shaft 132 (Fig. 5–A), through the spring 133, yieldingly carries the detent 128 rearwardly in unison therewith to move the teeth in the openings in said detent beneath the corresponding flat lower surfaces on the pins 125 to lock all undepressed amount keys in undepressed position during machine operation. Near the end of machine operation, the shaft 132 is restored counter-clockwise to move the detent 128 forwardly to ineffective position, and simultaneously a key release shaft 134, journaled in the keyboard framework, receives counter-clockwise key-releasing movement. This, through an arm in cooperation with the corresponding upward extension of the flexible detent 127, shifts said detent rearwardly, against the action of the spring 129, to disengage the shoulder from the upper flat surface on the depressed amount key to free said key to the action of its spring, which immediately restores said key upwardly to undepressed position. The key release shaft 134 functions as explained above in adding and subtracting operations to release the depressed amount keys 97 at the end of machine operation. However, in total and sub-total operations, said shaft will receive its counter-clockwise releasing movement at the beginning of machine operation to release any inadvertently-depressed amount key prior to such operation, to prevent the possibility of an erroneous total being printed.

Each of the amount keys 97 (Fig. 5–A) has, secured in the lower end of its stem, a square stud 135, which coacts with a corresponding stop shoulder 136 formed on graduated steps on a slide 137, shiftably connected to a corresponding pitman 138, the forward end of which engages a corresponding side-spacing slot in a bar 139, mounted in the keyboard framework. The slide 137 is disengageably connected to the pitman 138 by a latch 140 (Figs. 5–A and 6), pivoted on a stud 141 in said slide, said latch being urged clockwise by a spring 142 to normally maintain a shoulder 143 on its rear end in the path of a tooth 144 secured to said pitman 138. In adding and subtracting operations, the slide 137 and the pitman 138 operate back and forth in unison as a single unit, and under such conditions the latch 140 remains in engagement with the tooth 144.

As explained previously, the key release shaft 134 (Figs. 5–A and 6) receives counter-clockwise movement at the beginning of total and sub-total operations to release any inadvertently-depressed amount key 97. This counter-clockwise movement of the shaft 134 causes an arm 145, secured on said shaft and pivotally connected at 146 to the upper end of a bar 147 with a slot in its lower end which engages a guide stud 148 in the partition plate 124, to shift said bar 147 downwardly. Downward movement of the bar 147 causes a downward surface 149 thereon to engage a bent-over ear 150 on the latch 140 and rock said latch counter-clockwise against the action of the spring 142. This moves the shoulder 143 out of the path of the tooth 144, to disconnect the slide 137 from the pitman 138, so that said slide may remain stationary while the pitman moves rearwardly to be positioned under control of the selected totalizer wheel in a manner to be explained later. This provides an extra precaution to prevent the printing of an erroneous total by insuring that the inadvertent reention of a key 97 is depressed condition will not influence the positioning of the pitman 138 in total and sub-total operations.

After the latch 140 has been disengaged as explained above, and the pitman 138 has moved rearwardly independent of the slide 137, clockwise restoring movement of the shaft 134 and the bar 147 frees said latch 140 to the action of the spring 142, which restores said latch clockwise until an extension 151 thereof comes into contact with a stud in said slide 137, to which one end of the spring 142 is connected. This retains the latch 140 in proper engaging relationship to the tooth 144, so that said parts will coact properly upon restoring movement of said pitman 138 in a forward direction. Restoration, or forward return movement, of the pitman 138 causes the tooth 144 to by-pass the shoulder 143 on the latch 140 just prior to contact of abutting shoulders on the slide 137 and said pitman, to again couple said parts for concert movement.

The pitman 138 (Figs. 5–A and 6) has secured near its forward end a zero stop block 152, the upper edge of which coacts with teeth on a zero latch 153 free on a rod 154 supported in the keyboard framework. A bent-over upward extension of the latch 153 is maintained in yielding contact with the forward end of the control plate 126 by a spring 155 tensioned between said extension and a stud in said control plate. Depression of one of the amount keys 97 causes the pin 125 therein, in cooperation with a corresponding camming surface in the opening in the plate 126, to shift said plate forwardly against the action of the spring 129, causing said control plate to rock the zero latch 153 counter-clockwise to move the teeth thereon out of the range of the stop block 152 to free the pitman 138 for rearward positioning movement, as will be explained presently. If no amount key 97 is depressed in the row shown in Fig. 5–A, the zero latch 153 will remain effective and, in cooperation with the block 152, will retain the pitman 138 in its forward, or zero, position, as shown here. In total and sub-total taking operations, it is necessary to release the zero latch 153 to free the pitman 138 for rearward movement, so that it may be positioned under control of the selected totalizer, and this is accomplished by means of the counter-clockwise movement of the key release shaft 134 near the beginning of total and sub-total operations, which movement, through an arm secured on said shaft, in cooperation with an upward camming extension on the control plate 126, shifts said control plate forwardly, against the action of the spring 129, to rock the zero latch 153 counter-clockwise to ineffective position, to free the pitman 138 for positioning movement rearwardly.

A hole in the rear end of the pitman 138 (Fig. 5–A) freely engages a stud 157 in a segment 158 free on a shaft 159 supported by the machine framework. The segment 158 is pivotally connected by a link 160 to a printing sector 161 freely connected to the upper end of an arm 162 in turn rotatably supported on a shaft 163, journaled in the machine framework. The arm 162 is connected to an operating arm 164 by a pin-and-slot connection, and an anti-rebound pawl 165, in cooperation with a comparatively strong printing sector operating spring 166, forms a yieldable connection between said arms 162 and 164 to prevent rebound of the printing sector 161, after its printing stroke, thereby eliminating danger of smudging the record material. The operating arm 164 has a tooth normally engaged by a printer-operating trigger 167 mounted in the machine framework. Another tooth on the operating arm 164 cooperates with a tooth formed on the upper end of a zero elimination pawl 168 (Fig. 5–A) free on a rod supported by the machine framework and having a downwardly-extending tail which coacts with a stud 170 carried by the segment 158. A spring 169 urges the pawl 168 clockwise to normally maintain said pawl in effective position as shown here.

A comparatively strong spring 171 (Fig. 5–A), tensioned between the segment 158 and a spring plate connected to a cross bail 172 supported between similar arms 173 (only one shown here) of a leading frame, said arms being free on the shaft 159, normally maintains an inward or rearward surface of said segment 158 in yielding engagement with a forward surface of said cross bail 172. The leading frame bail 172 operates first rearwardly or counter-clockwise and, through the spring 171, carries the segment 158, the pitman 138, and the slide 137 (Figs. 5–A and 6) rearwardly in unison therewith until such movement is stopped, in adding and subtracting operations, by the stud 135 in the depressed amount key 97 coming into contact with the corresponding step 136 on said slide 137. This obstructs further movement of the pitman 138 and, through the segment 158, positions the printing sector 161 in accordance with the value of the depressed amount key.

The leading frame bail 172 continues its rearward movement without interruption, stretching the spring 171. Initial movement of the segment 158, in a counter-clockwise direction, causes the stud 170 to rock the zero elimination pawl 168 counter-clockwise, against the action of the spring 169, to move the tooth of said pawl out of the path of the tooth on the operating arm 164.

After the leading frame bail 172 has completed its initial movement in a counter-clockwise or rearward direction, and the printing sector 161 has been positioned as explained above, the trigger 167 is rocked counter-clockwise out of engagement with the tooth on the arm 164 to free said arm and its companion arm 162 to the action of the spring 166, which carries said arm and the printing sector 161 rearwardly, causing said printing sector to engage first the inking ribbon (not shown) and then the record material carried by the platen 76 to print the value of the depressed amount key 97 upon said record material. Clockwise printing movement of the arm 164 (Fig. 5–A) is interrupted by a surface 174 on said arm coming into contact with a stop bar 175 supported in the printer framework. However, the flexible connection formed by the anti-rebound pawl 165 and the spring 166 permits the arm 162 and the printing sector 161 to travel independently of said arm 164 the slight distance necessary to complete the printing stroke. Immediately after the printing stroke has been completed, the spring 166, through the pawl 165, returns the arm 162 and the printing sector 161 a slight distance away from the platen roll, so that any rebounding action of said printing sector will be absorbed by said pawl 165 and said spring 166.

The segment 158 has, on its outer periphery, alining teeth 176, which cooperate with an alining bar 177 extending between similar arms 178 (only one shown here) secured on an aliner shaft 179 journaled in the machine framework. Also secured to the aliner shaft 179 is a cam arm 180 connected to a companion arm 181, free on said shaft 179, by a comparatively strong spring 182 to form a connection which can yield in case the aliner 177 accidentally stumbles on one of the alining teeth 176. The arms 180 and 181 carry rollers which cooperate, respectively, with the peripheries of companion plate cams 183 and 184 secured on a main cam shaft 185 journaled in brackets depending from the lower surface of the base 52, said cam shaft making one clockwise revolution (Fig. 5–A) each machine operation to operate the mechanism of the machine. After the segment 158 has been positioned under control of the depressed amount key 97 as explained above, and prior to operation of the printing sector 161, the aliner 177 receives initial clockwise movement by the cams 183 and 184 to engage the teeth 176 to secure the segment 158 and the printing sector 161 in set positions during printing movement of said sector 161, as explained above.

When no amount key 97 is depressed in the bank illustrated in Fig. 5–A, the segment 158 remains in home, or zero, position, as shown here, and consequently the zero elimination pawl 168 remains effective to block operation of the arm 164, when the trigger 167 is released, as explained above, to prevent the printing of zeros in all orders in which no amount key is depressed. In all types of operations, it is desirable that the zeros in the lower orders print, and, to effect this, the pawl 163 is operatively connected to its adjacent lower order pawl, and, when said pawl 168 is moved counter-clockwise by movement of the segment 158 out of home position, it rocks the adjacent lower order pawl out of engagement with the corresponding tooth of its operating arm 164 to free said arm so that printing movement will be imparted to the lower order printing segment to record a zero in said adjacent lower order, and this action continues through all the lower orders.

The operation of the printing arms 12 and the corresponding printing sectors 161 may be controlled by the traveling carriage in preselected columnar positions thereof, through the medium of control plates 74, in cooperation with corresponding sensing fingers 75, which in turn control the positioning of a non-print bail 187 (Fig. 5–A) in relation to an upper projection on the arm 164, the inner surface of said bail being mutilated in the required manner to form steps which control the operation of the arms 164 and their corresponding printing sectors 161. In this case, the length of the control plate 74 (Fig. 5-A) controls the inward movement of the bail 187 to determine whether one or more of the control steps thereon coact with the corresponding projections on the arms 164.

Printing movement of the printing sectors 161 may be further controlled by means of the traveling carriage in preselected columnar positions thereof, through the medium of adjustable cam fingers 189 (Fig. 5-A) mounted in the control stops 73. The fingers 189 are adjustable inwardly from ineffective position different extents to two effective positions to control the movement of a coacting cam lever 190. The lever 190 is connected to and operates a printer control bail 188, which in turn coacts with projections on the printing arms 162, to obstruct the clockwise printing movement of said arms when said bail is positioned over the corresponding projections. As in the case of the bail 187, the bail 188 may be undercut in any desired manner, so that, when the finger 189 is adjusted so as to impart partial movement to the lever 190, certain undercut surfaces of said bail 188 will become effective to coact with the corresponding projections on the arms 162 to obstruct printing movement of said arms, and, when said cam finger 189 is so adjusted as to impart full movement to the lever 190, the entire bail 188 will become effective to coact with the projections on the printing arms 162 to obstruct printing movement of said arms and the corresponding printing sectors 161.

The pitman 138 (Figs. 5-A and 5-B) for the amount bank being described is pivotally connected by a link 192 to a corresponding lever 193 free on a shaft 194 supported in the machine framework. A downward extension of the lever 193 carries a stud 195, which engages a vertical slot 196 in the forward end of an actuator rack 197, supported for horizontal sliding movement by means of slots in upward extensions of a sub-base 198, secured to the main base 52. The rack 197 is retained in the slots in the sub-base 198 by means of horizontal bars 199 and 200, which are secured to finished surfaces on pads formed on the sub-base 198. From the foregoing description it should be evident that any differential positioning imparted on the segment 158 by the amount keys 97 will, through the link 192 and the lever 193, be imparted to the actuator rack 197 to position said rack in accordance with the value of the depressed amount key.

*Totalizers in general and their actuation*

Gear teeth 201 (Fig. 5-B), formed on the upper edge of the actuator rack 197, are arranged to be engaged with similar teeth formed on a main balance totalizer wheel 202 for the same order, said wheel being rotatably mounted on a tubular shaft 204 supported for horizontal shifting movement in a balance totalizer framework 205. The frame work 205 is mounted for vertical shifting movement, to engage and disengage the wheel 202 and the rack 197 in proper timing for the type of operation being performed. The main wheel 202 of the order being described is in constant mesh with and drives in a reverse direction a companion auxiliary totalizer wheel 203, which is rotatably supported on a tubular shaft 207 mounted in the balance totalizer framework 205, for horizontal selecting movement and for up-and-down engaging and disengaging movement, in unison with its companion wheel 202. The wheel 203 has teeth which are arranged to be engaged with the teeth 201 in the rack 197 during overdraft total-taking operations in the balance totalizer, to control positioning of said actuator and the connected printing sector 161 in such operations, to cause a true negative amount of the overdraft to be printed upon the record material, as will be explained more fully later.

The teeth 201 in the acuator rack 197 likewise coact with teeth in corresponding order wheels 208 of a series of group or storage totalizers, rotatably supported on a tubular shaft 209, in turn supported for horizontal shifting movement, to select the different sets of group totalizers, in a totalizer frame work 210, which is mounted for vertical shifting movement in the machine, to engage and disengage the selected totalizer wheel 208 and the actuator 197. The group totalizer assembly 210 is shown here having four sets of group totalizer wheels 208; however, this is a matter of choice, as the machine may be provided with eight sets of group totalizer wheels 208 on the line 209 if necessary for the business system to which the machine is being applied.

Provisions have been made in the present machine for the addition of a second group totalizer assembly 212, shown in Fig. 5-B in dot-and-dash lines, which may have a maximum of eight sets of group totalizer wheels 211 for coaction with the amount actuators 197 in exactly the same manner as explained for the other group totalizer 210.

In adding and subtracting operations, the group totalizer line 209 is first shifted horizontally to aline the selected set of totalizer wheels 208 theron with the corresponding amount actuators 197, which are positioned, in the manner explained before, in accordance with the value of the depressed amount keys 97. In adding operations, after the actuator rack 197 (Figs. 5-A and 5-B) has been positioned by the depressed amount key, and after the leading frame bail 172 has completed its initial movement toward the rear, downward engaging movement is imparted to the framework 210 to engage the corresponding selected wheel 208 with the actuator 197 prior to its forward return movement, which movement advances said wheel in an additive direction to enter therin the value of the depressed amount key. After the actuator 197 has completed its forward return movement, upward disengaging movement is imparted to the group totalizer frame 210 to disengage the wheel 208 from said actuator. In subtracting operations, downward engaging movement is imparted to the group totalizer frame 210, prior to initial movement of the actuator 197, to engage the corresponding wheel 208 with said actuator. Initial movement rearwardly of the actuator 197 rotates the selected group totalizer wheel 208 in a reverse or subtractive direction until rearward movement of said actuator is terminated by the depressed amount key 97, to subtract from said wheel 208 the value of said depressed amount key. After the actuator 197 and the leading frame bail 172 have completed their initial rearward movements, upward disengaging movement is imparted to the group totalizer framework 210 to disengage the wheel 208 from the actuator 197 prior to its return movement, after which said actuator is restored by the leading frame bail 172 forwardly to its normal, or zero, position, as shown here.

What has been said above concerning engaging and disengaging movement of the group totalizer wheels 208 in adding and subtracting operations applies equally as well to the balance totalizer 205 and to the second group totalizer 212, the selected wheels 211 of which are actuated in adding and subtracting operations exactly in the same manner as explained for the group totalizer 210.

In sub-total and total operations, often referred to as "reading" and "resetting" operations, the group totalizer line 209 (Fig. 5-B) is shifted first in a horizontal direction to aline the selected set of group totalizer wheels 208 with the actuators 197, and, as in subtract operations, the group totalizer frame 210 receives downward engaging movement to engage the corresponding wheel 208 of the selected group totalizer with the actuator 197 prior to its initial movement. As previously explained, initial, counter-clockwise, movement of the key release shaft 134 at the beginning of sub-total and total operations (Fig. 5-A) shifts the bar 147 downwardly to disengage the latch 140 from the tooth 144 to separate the key stop slide 137 from the amount actuator pitman 138, so that said pitman is free to be positioned under control of the selected totalizer wheel without any danger of being maladjusted through the inadvertent retention of one of the corresponding amount keys 97 in depressed condition. Likewise, initial counter-clockwise movement of the key release shaft 134 shifts the control plate 126 forwardly, in the manner explained previously, to rock the zero latch 153 counter-clockwise to ineffective position to free the actuator pitman 138 for rearward positioning movement.

Initial, rearward, movement of the pitman 138 and the actuator rack 197 rotates the corresponding selected totalizer wheel 208 in a reverse direction until such movement is stopped by the long tooth on said wheel coming into contact with the corresponding tens transfer pawl, as will be explained later, to zeroize said wheel and to position the actuator rack 197 and the pitman 138 in accordance therewith, which positioning is transmitted by the segment 158 to the printing sector 161. Operation of the sector 161 records the value of the amount taken from the totalizer wheel upon the record material supported by the platen roll. In total operations, the group totalizer framework 210 receives its upward, or disengaging, movement, prior to return movement of the actuator rack 197, and consequently the wheel 208 remains in a zeroized condition. In sub-total operations, the corresponding wheel 208 remains in engagement with the rack 197 during its return movement and is restored to its original condition. After the rack 197 has completed its return movement, disengaging movement is imparted to the framework 210 to disengage the wheel 208 from the actuator 197.

Sub-total and total operations are performed in the balance totalizer 205 and in the group totalizer 212 in exactly the same manner as explained in connection with the group totalizer 210, with the exception of overdraft sub-total and total operations in the balance totalizer 205, in which, as previously explained, lateral shifting movement is imparted to the main and auxiliary shafts 204 and 207 to move the main wheel 202 out of alinement with the actuator 197 and to simultaneously move its companion auxiliary storage wheel 203 into alinement with said actuator. The auxiliary wheel 203 is then engaged with the actuator 197 prior to its initial movement in a rearward direction, which movement rotates said wheel in a subtractive direction and simultaneously rotates the companion wheel 202 in an additive direction until said wheels are stopped in a position corresponding to zero, by fixed stops, which are brought into alinement with said wheel 202 when it is shifted out of alinement with the actuator 197. This causes the actuator 197 and the corresponding printing sector 161 to be positioned in accordance with the true negative balance on the corresponding wheel of the balance totalizer. However, as is usual with this type of balance totalizer, the units wheel 202 is incorrect by one digit, and this must be corrected by the entering of a digit, often referred to as a "fugitive 1," which is entered subtractively in the units wheel 202 when the highest order balance totalizer wheel 202 passes through zero while traveling in a subtractive direction. In case the highest order balance totalizer wheel 202 passes through zero while traveling in an additive direction—that is, changes from an overdrawn condition to a positive condition—the "fugitive 1" is entered additively in the units wheel 202 to correct the error of one digit in said wheel. In overdraft sub-total operations, the auxiliary wheel 203 remains in engagement with the actuator rack 197 during its forward return movement to restore the companion main wheel 202 to its original condition, and, in overdraft total operations, sometimes referred to as "credit balance operations," the auxiliary wheel 203 is disengaged from the actuator 197 after it has completed its rearward movement and prior to its return movement, and consequently said wheel and its companion main wheel 202 remain in a zeroized condition.

A single tens transfer mechanism is used for all of the sets of totalizer wheels 208 on the group totalizer line 210, said totalizer wheels being operatively alined with said tens transfer mechanism when they are shifted into alinement with the actuators 197. The tens transfer mechanism is normally in adding position, in which tens digits are entered additively in higher orders when the adjacent lower order wheel passes through zero while being rotated additively by the actuator 197. Selection of a group totalizer for a subtract operation causes the tens transfer mechanism to be shifted from adding position to subtracting position, and, when a lower order wheel is rotated by the actuator 197 in a subtractive direction through zero, a tens digit is borrowed from the adjacent higher order. In sub-total and total operations, the transfer mechanism remains in adding position, and the tripping teeth thereon coact with the long teeth of the selected set of totalizer wheels 208 to stop said wheels in zero position when they are reversely rotated from preset positions to zero by rearward movement of the actuators 197 (Figs. 5-A and 5-B) in the manner explained above.

Balance totalizer or crossfooter in detail

The balance and group totalizers disclosed herein have many general features which are similar to the totalizers disclosed in the United States Patent No. 2,503,865, issued April 11, 1950, to R. A. Christian, and reference may be had to this patent for a full disclosure of mechanism believed not to be pertinent to the present invention, and which for that reason will only be described in a general way herein.

The balance totalizer or crossfooter 205 (Figs. 5B, 7, and 20) is supported in a framework comprising a right plate 215, left plate 216, and central plate 217, secured to the sub-base 198 which, as previously explained, is in turn secured to the main base 52. The group totalizer 210 is supported in a framework similar to that described for the balance totalizer, said framework comprising a right plate 218 (Fig. 26) which is similar in every respect to the corresponding plate 215 for the balance totalizer, and center and left plates which are similar in every respect to the corresponding plates 217 and 216 for the balance totalizer. The right plates 215 and 218 of the balance and group totalizers, and the corresponding left end plates 216 are further secured in fixed relationship to each other by right and left tie bars 219 and 220, which are secured thereto and which in turn support tie rods 221, 222 and 223 (Figs. 5B and 26) which further assist in securing said plates in rigid side-spaced relationship to each other. The bars 219 and 220 are secured at their forward ends by screws 224 to the rearward ends of the corresponding adjacent main frames 50 and 51.

The shaft 204, which supports the main balance totalizer wheels 202, (Fig. 7) is shiftable horizontally in bushings 225 and 226, secured, respectively in a right support plate 227 and a left support plate 228, and in a bushing 229, fast in a central support plate 230. The plates 227, 228, and 230, are mounted for vertical engaging and disengaging movement by means of vertical slots in the stationary plates 215, 216 and 217, which slots are engaged by flattened surfaces on the bushings 225, 226 and 229, and further by the upper edges of said plates 227, 228 and 230, which engage corresponding annular grooves in the rods 221 and 222 (Figs. 5B and 20). The plates 227, 228 and 230 are further mounted for vertical shifting movement by means of slots therein which engage a totalizer engaging and disengaging shaft 231 journaled in bushings in the plates 215, 216, and 217. The plates 227, 228 and 230, rotatably support a totalizer aliner shaft 232 (Fig. 7) opposite ends of which fit snugly in vertical slots provided in the plates 215, 216 and 217.

Referring to Figs. 7 and 21, secured on the engaging shaft 231 are two pairs of cranks 233, each pair of which supports an engaging rod 234 in exact radial alinement, and which operate as a single rod in unison with the engaging shaft 231. The righthand rod 234 (Figs 7 and 31) carries a roller 235, which engages a camming slot 236 in the right plate 227 and the lefthand rod 234 carries a similar roller 235, which engages a similar slot (not shown) in the left hand plate 228.

Referring to Figs. 7, 10 and 29, secured near the lefthand end of the engaging and disengaging shaft 231, is a crank 237 having pivotally connected thereto the rearward end of an engaging link 238 the forward end of which is pivotally connected to the lower end of an arm 239 free on a rod 240 supported by the machine framework. The arm 239 has pivotally connected thereto the rearward end of a pitman 241, the forward end of which is slotted to slidably embrace a rod 242 supported by the machine framework. Pivotally mounted on the pitman 241 is an engaging hook 243 urged counter-clockwise by a spring 244 (Fig. 10) tensioned between said hook and an upward extension of the pitman 214, to normally maintain a stop stud carried by said hook in engagement with the upper edge of the pitman 241, to locate said hook in proper coacting relationship with an engaging and disengaging bar 245. The bar 245 is mounted to slide horizontally in parallel slots in the machine framework, and each end of said bar is connected to companion links 246, the forward ends of which are pivotally connected to an arm 247 and a lever 248 secured on a shoft shaft 249 journaled in the machine framework. The lever 248 carries rollers 250, which cooperate, respectively, with the peripheries of companion plate cams 251 and 252 secured on the main cam shaft 185, and making one counterclockwise revolution in unison therewith, as viewed in Fig. 10, each machine operation. The engaging hook 243 (Figs. 10 and 11) has a tail 253, which cooperates with a finger of a control lever 254 carrying a stud 309 which engages a slot in a hook-shaped rearward extension of a control slide 308 which is positioned under control of the balance totalizer control keys, and the traveling carriage in preselected columnar positions thereof. The slide 308 causes the control lever 254 to control the positioning of the engaging hook 243 in relation to the engaging bar 245 to cause said bar to be coupled to the engaging pitman 241 in proper timing for the type of operation being performed.

The bar 245 is operated by the cams 251 and 252 (Fig. 10) first forwardly from the position here shown in two steps of movement, and then rearwardly or in a return direction, also in two steps of movement. The bar 245, during its forward movement, shifts the pitman 241 also forwardly, which through the link 238 rocks the crank 237 and the shaft 231 (Figs. 10 and 29) clockwise as here viewed, and counterclockwise as viewed in Fig. 31. Counterclockwise movement of the shaft 231 (Fig. 31), the cranks 233, and the rod 234, causes the rollers 235, in cooperation with the cam slots 236 to shift the plates 227, 228 and 230, forming the support for the shaft 204, downwardly to engage the balance totalizer wheels with the amount actuators 197 in proper timing for the type of operation being performed. Return movement rearwardly of the engaging bar 245 (Fig. 10) restores the shaft 231 counterclockwise as here shown, and clockwise, as shown in Fig. 31, to disengage the wheels of the balance totalizer from the amount actuators 197 in proper timing for the type of operation being performed.

The operation and control of the totalizer engaging and disengaging mechanism, including the bar 245 (Fig. 10), the hook 243, the lever 254, and the slide 308, are fully disclosed in Figs. 55, 56 and 100, and the description in connection therewith of the Christian Patent No. 2,626,749, to which reference may be had for a more detailed description of this mechanism.

There are ten denominational orders of amount keys 97 and their corresponding actuator racks 197, and likewise there are ten denominational orders of main balance totalizer wheels 202 (Figs. 5A, 5B and 10) and their companion wheels 203, which, as previously explained, are geared thereto and are, therefore, always in complementary relationship to each other.

The tubular shaft 207, which supports the auxiliary wheels 203, is slidably supported at opposite ends in bushings in the plates 227 and 228. Two identical arms 255 (Figs. 7 and 22) extending between and secured to each of the tubular shafts 204 and 207, cause said shafts to slide horizontally in fixed relationship to each other, to move the selected set of balance totalizer wheels 202 or 203 into alinement with the corresponding actuators 197.

In adding operations, the main wheels 202 of the balance totalizer (Figs. 5A, 5B, 7 and 20) are engaged with the amount actuators 197 after said actuators have completed their initial movements and have been positioned under control of the corresponding depressed amount keys 97. Return movement forwardly of the amount actuators causes them to rotate the wheels 202 in an additive or clockwise direction to enter therein the value of the depressed amount keys, and near the end of the machine operation, said wheels 202 are disengaged from said amount actuators. In subtracting operations, the wheels 202 are engaged with the amount actuators 197 prior to their initial movement, which movement causes said actuators to be positioned by the depressed amount keys 97, and while being positioned they rotate the main wheels 202 in a subtractive or counter-clockwise direction to subtract therefrom the value of said depressed amount keys.

In sub-total operations the main wheels 202 are engaged with the amount actuators 197 prior to their initial movement, which movement reversely rotates said wheels, in a counter-clockwise direction, until the long teeth thereon come into contact with a corresponding tens transfer tripping tooth 258 which, in this instance, serves as a stop to locate said wheels in zero position and to position the amount actuators and the corresponding printing sectors 161 (Fig. 5-A) in accordance therewith. In sub-total operations the wheels 202 remain in engagement with the amount actuators during their return movement forwardly, which movement restores said wheels to their original positions to preserve the total therein. Total operations are exactly the same as sub-total operations explained above, except that the wheels 202 are disengaged from the amount actuators 197 prior to their return movement, and as a result said wheels remain in a zeroized condition.

When the balance totalizer becomes overdrawn, a condition is set up which functions in total and sub-total operations to cause the shaft 204 for the main totalizer wheels 202 (Figs. 7 and 20) and the shaft 207 for the auxiliary totalizer wheels 203 to be shifted horizontally so as to aline said auxiliary wheels 203 with the amount actuators 197. The shifting of the main totalizer wheels 202 out of alinement with the amount actuators simultaneously shifts the long teeth of said wheels into alinement with a fixed overdraft stop tooth 259 (Figs. 7, 20 and 21) on a corresponding order plate 260. The plates 260 are shifted up and down by the rod 234, in cooperation with camming slots 261 therein, which are similar in outline to the camming slot 236 (Fig. 31) and consequently said plates 260 move up and down in unison with said plate 227 and the totalizer shafts 204 and 207. In overdraft sub-total and total operations, the auxiliary wheels 203 are engaged with the amount actuators 197 (Figs. 5A and 5B) prior to their initial movement rearwardly, which movement rotates said wheels in a reverse or counter-clockwise direction, and said wheels in turn rotate their corresponding main wheels 202 in an additive or clockwise direction until the long teeth thereon come into contact with the overdraft stop teeth 259 to position said amount actuators in accordance with the true negative balance standing on said wheels. The actuators in turn position the corresponding printing sectors 161 accordingly to cause the true negative balance to be printed upon the record material supported by the platen roll 76. There is one of the plates 260 (Figs. 7 and 21) for each denominational order of the balance totalizer, and a similar plate for each order of the group totalizer 210.

Tens transfer mechanism

A tens transfer mechanism, which coacts with the selected set of totalizer wheels, is provided for transferring tens digits from lower to higher denominations in adding operations and for transferring tens digits from higher to lower denominations in subtracting operations. The tens transfer mechanism disclosed herein is similar in many respects to that disclosed in the Christian Patent No. 2,503,865, and for that reason will be briefly described in connection with the balance totalizer.

Each denominational order, with the exception of the lowest order, is provided with a transfer segment 262 (Figs. 7 and 20) having teeth which coact with the teeth of the corresponding main totalizer wheels 202. The transfer segment 262 for the order shown in Fig. 20, is pivotally mounted on a stud 263 in a corresponding order plate 264 mounted to slide vertically between the rods 221 and 222 and the shafts 231 and 232. An arcuate surface on the right edge of the transfer segment 262 has a notch engaged by a segment release latch 265 free on a stud 266 in the plate 264, and urged clockwise into yielding engagement with said notch by a spring 267. A righthand extension of the latch 265 carries a stud 268, which cooperates with an operating surface 269 on the upper end of a corresponding latch operating arm 270 pivoted on a stud 271 in the corresponding order plate 260 (Fig. 21). The arm 270 carries a stud 272 with a flat surface which coacts with the end of transfer trip pawl 273 free on a transfer shifting shaft 274 rotatably supported in the plates 227, 228 and 230 (Fig. 7) and in the order plates 260. The pawl 273 is connected, by a hub 276 free on the shaft 274, to a corresponding trip arm 277 having a slot in its downward end which coacts with a stop stud 278 in the corresponding plate 260 to limit the movement of said arm 277. The arm 277 has pivotally connected thereto a corresponding tripping plate 279, having the tripping tooth 258, mentioned earlier herein, which coacts with the long tooth of the corresponding totalizer wheel 202, in adding, subtracting and total-taking operations. A spring 275, tensioned between the arm 270 and the pawl 273, urges said arm counter-clockwise and said pawl and the corresponding arm 277 clockwise, to normally maintain the rearward edge of the slot in the lower end of said arm in yielding contact with the stop stud 278.

The upper edge of the plate 279 (Fig. 20) has formed thereon arcuate surfaces 280, which coact with a shifting finger 281 secured on the shaft 274. A crank 282 secured to the transfer segment 262 carries a stud 283, to which is connected the downward end of a spring 284, the upper end of which is connected to a spring bail 285 extending the length of the totalizer and passing through openings 286 and 287 in the plates 260 and 264, respectively.

The bail 285 is mounted for rocking movement from adding to subtracting position and vice versa, by three cranks 288 (Figs. 22 and 23) secured to said bail and pivotally mounted on the studs 263, which likewise provide a pivoting support for the corresponding transfer segments 262. Pivotally engaging the bail 285 are the forward ends of three shifting links 289, the rearward ends of which are pivotally connected to the upper ends of three craanks 290, secured on the transfer shifting shaft 274.

In Fig. 20, the tripping tooth 258 and the bail 285 are shown in adding position, and means for rocking said tooth and bail from adding to subtracting position and vice versa will now be described. Secured on the lefthand end of the shaft 274 (Figs. 10 and 11) is an arm 292 carrying studs 293 and 294, which coact with an arcuate surface on the lower edge of an operating arm 295 free on a stud 296 carried by a slide 297 mounted for angular sliding movement by means of slots therein in cooperation with bushings on the shafts 231 and 274. The slide 297 has a slot in its forward edge which embraces a stud 298 in an operating arm 299 secured on the engaging shaft 231, which shaft turns first clockwise, as viewed in Fig. 11, to shift said slide 297 downwardly, and then counter-clockwise to restore said slide upwardly. A spring 300 (Fig. 11) urges the arm 295 counter-clockwise to normally maintain a shoulder formed in a notch on the forward edge thereof in yielding engagement with a stop stud 301 fast in the slide 297. The arm 295 carries a stud 302, which coacts with a finger 303 on a pitman 304 mounted for horizontal shifting movement by means of a slot near the rearward end thereof, in cooperation with a bushing on the shaft 231, and by means of a slot near the forward end thereof, which engages a corresponding groove in a stud 305 secured in the machine framework. A spring 306 urges the pitman 304 forwardly to normally maintain a bent-over ear 307 thereon in yielding contact with a nose on the rearward end of the control slide 308 for the balance totalizer, which, as previously explained, is positioned under control of the balance totalizer control keys 113, 114 and 115 (Figs. 1 and 2) or by means of the traveling carriage in preselected columnar positions thereof. The slide 308 has a slot near its rearward end which engages the stud 309 in a downward extension of the lever 254 (Figs. 10 and 11) and positions said lever 254 in relation to the tail 253 of the engaging hook 243 to control the engaging and disengaging movement of the balance totalizer in the manner explained previously.

In adding operations, the slide 308 is positioned a substantial distance forwardly from the position shown in Fig. 11, to permit the spring 306 to carry the pitman 304 forwardly in unison therewith, whereupon the finger 303 engages the stud 302 and rocks the arm 295 clockwise, against the action of the spring 300, to move the arcuate surface on the lower edge of said arm into the path of the stud 294 in the arm 292. This positioning of the arm 295 occurs prior to initial or engaging movement of the shaft 231, which movement, through the arm 299, shifts the slide 297 downwardly, causing the arcuate surface on the arm 295 to engage the stud 294 and rock the arm 292 and shaft 274 counter-clockwise from subtract position, as shown in Fig. 11, to adding position as shown in Fig. 20, in which movement of said shaft 274 and the finger 281 is in a clockwise direction. This clockwise movement of the shaft 274 (Figs. 20, 22 and 23) through the cranks 290, shifts the links 289 forwardly, causing said links to rock the cranks 288 and the bail 285 also clockwise from subtract position, as shown in dot and dash lines in Figs. 20 and 22, to adding position, as shown in full lines in said figures, in which the spring 284, which extends between said bail and the transfer segment 262 for the order being described, urges said segment in a counter-clockwise or additive direction.

The plates 264 (Fig. 20) which carry the transfer segments 262, have camming slots 310, which coact with the engaging rod 234. Initial movement of the engaging shaft 231 causes said rod, in cooperation with the camming slot 310 and the camming slots 261, in the plates 264 and 260, for the order being described, to shift said plates downwardly first in unison, and the slots 236 (Fig. 31) in the plates 227, 228 and 230, which slots are similar in outline to the slots 261, cause said plates and the balance totalizer 202, to move downwardly and upwardly in unison with said plate 260. As previously explained, the plates 227, 228, 230, 260 and 264 move downwardly in an engaging direction in unison, until the teeth of the main balance totalizer wheels 202 just begin to mesh with the corresponding teeth in the rack 197, and during this movement the transfer segment 262 remains in engagement with the corresponding totalizer wheel 202 to insure that said wheel is not displaced during its engaging movement. After the teeth of the wheel 202 have started to engage the teeth in the actuator 197, the slot 310 (Fig. 20) in cooperation with the rod 234, shifts the plate 264 upwardly to disengage the teeth of the transfer segment 262 from the teeth of the totalizer wheel 202, and to simultaneously engage the stud 283 with a notch 311 (Fig. 24) formed in the plate 260 to hold the segment 262 against displacement during the period it is disengaged from the corresponding totalizer wheels 202.

As previously explained, in adding operations the wheel 202 is engaged with the corresponding actuator 197 after it has completed its initial movement rearwardly to be positioned under control of the depressed amount key, and return movement forwardly of said actuator rotates the wheel 202 in a clockwise or additive direction. If during clockwise rotation of the wheel 202, the long tooth thereon wipes past the tripping tooth 258, the arm 277 and pawl 273 are rocked counter-clockwise against the action of the spring 275, until said pawl is moved out of the path of the flat surface on the stud 272. This frees the arm 270 to the action of the spring 275 (Fig. 24) which immediately rocks said arm counter-clockwise until a flat surface thereof comes in contact with a transfer restoring rod 312 supported in the lower end of several cranks 313 (Fig. 20) in turn secured on a transfer restoring shaft 314, rotatably supported in the plates 215, 216 and 217 (Fig. 7). After the amount actuator has completed its return movement forwardly in adding operations, the shaft 231 and the engaging rod 234 are restored clockwise, which movement causes said rod to restore plates 227, 228, 230 and 260 upwardly, and at the same time to move the plates 264 downwardly to disengage the totalizer wheel 202 from the corresponding actuator 197, and to reengage the transfer segment 262 with the totalizer wheel. Return movement upwardly of the plate 260 and the companion plate 264, causes the stud 268 (Fig. 24) to engage the surface 269 on the upper end of the arm 270 to rock the latch 265 counter-clockwise against the action of the spring 267 (Fig. 17) to disengage said latch from the notch in the transfer segment 262 for the adjacent higher order, after said segment has been reengaged with the teeth of the corresponding totalizer wheel 202. Continued upward movement of the plates 260, 264, 227, 228 and 230 disengages the teeth of the totalizer wheel 202 from the corresponding actuator, whereupon the spring 284 immediately becomes effective to rock the transfer segment 262 for said adjacent higher order, the equivalent of one tooth space in a counter-clockwise direction, which in turn drives the corresponding totalizer wheel one tooth space in an additive direction to transfer a tens digit from the adjacent lower order thereto.

At the beginning of the next machine operation, initial movement counter-clockwise of the restoring rod 312 and the restoring shaft 314 (Fig. 20) causes said rod to engage the tripped transfer arm 270 and restore it clockwise until the stud 272 is moved beyond the end of the pawl 273, whereupon the spring 275 returns said pawl into the path of said stud to latch said arm 270 in restored position, and to move the tripping tooth 258 back into the path of the long tooth of the corresponding totalizer wheel 202. Also in the succeeding machine operation, the operated transfer segment 262 is restored to normal or central position, after it is disengaged from the corresponding totalizer wheel 202, by the curved surfaces adjacent the notch 311 in the corresponding plate 260 (Figs. 20 and 24) and upon being so restored, the latch 265, under the influence of its spring, again engages the notch in said segment to retain it in restored or normal position, as here shown.

In subtract operations, the slide 308 (Figs. 10 and 11) receives comparatively little positioning movement forwardly, the pitman 304 remains substantially in the position here shown, in which the finger 303 does not contact the stud 302, and consequently the operating arm 295 remains in the path of the stud 293. Downward movement of the slide 297 at the beginning of machine operation causes the arcuate surface on the arm 295 to engage the stud 293 and rock the arm 292 and shaft 274 clockwise, as viewed in Fig. 11, and counter-clockwise as viewed in Fig. 20, from adding position, to subtracting position as shown in Fig. 25. This movement of the shaft 274 and the finger 281 causes said finger, in cooperation with the surface 280 of the plate 279, to rock said plate and the tooth 258 clockwise to move said tooth from adding position, as shown in Fig. 20, to subtracting position, as shown in Fig. 25. Counter-clockwise movement of the shaft 274 from adding to subtracting position likewise causes the cranks 290 (Fig. 22), in cooperation with the links 289, to rock the cranks 288 and the spring bail 285 also counter clockwise from adding position, as shown in Fig. 20, in full lines, to subtracting position as here shown in dot and dash lines.

As previously explained, in subtracting operations the wheel 202 of the balance totalizer is engaged with the corresponding amount actuator 197 prior to its initial movement rearwardly, which movement rotates said wheel in a subtractive or counter-clockwise direction to position said wheel in accordance with the amount key depressed. If the wheel 202 passes through zero while being rotated in a subtractive or counter-clockwise direction, the long tooth thereon engages the tripping tooth 258 (Fig. 25) and rocks the pawl 273 out of engagement with the stud 272 to trip the transfer mechanism for the adjacent higher order. The arm 270 disengages the latch 265 (Fig. 24) as explained in connection with adding operations, to free the transfer segment 262 for the adjacent higher order to the action of its spring 284, which in this case rotates said segment in a subtractive or clockwise direction, causing said segment in turn to rotate the corresponding totalizer wheel 202 the equivalent of one tooth space in a subtractive or counter-clockwise direction to borrow 1 from said adjacent higher order. In the succeeding operation the tripped transfer arms 270 (Figs. 20 and 24) are restored to untripped positions, and the operated transfer segments 262 are restored to normal or central position in exactly the same manner as explained in connection with adding operations.

The transfer restoring shaft 314 (Fig. 29) is operated to restore the tripped transfer arms 270, by means of a stud 315 carried by the arm 299, which coacts with a downward extension of an arm 316 pivoted on a stud in the plate 216 (Fig. 7). The arm 316 has another downward extension, which coacts with a stud 318 in a crank 319 secured to the left end of the shaft 314. The mechanism described above for operating the shaft 314 is located on the left side of the machine, and similar mechanism is provided on the right side of the machine for operating said shaft, and includes a crank 320 (Fig. 26) secured on the shaft 231 and carrying a stud 321 which coacts with a downward extension of an arm 322, similar to the right arm 316, pivoted on a stud in the plate 215, said arm having a downward extension which coacts with a stud in a crank 323 secured on the shaft 314. Each of the arms 316 and 322 is provided with a spring 324, which urges said arms counter-clockwise, as viewed in Fig. 26, to normally maintain the downward extensions of said arms in yielding engagement with the studs in the corresponding cranks 319 and 323.

Operation of the totalizer engaging shaft 231 near the beginning of machine operation, causes the corresponding studs 315 and 321 to engage the corresponding arms 316 and 322 and rock said arms first clockwise, as viewed in Figs. 20 and 26. The arms 316 and 322 in turn rock the corresponding cranks 232 and the transfer restoring shaft 314 counter-clockwise, causing the rod 312 to engage the tripped transfer arms 270 and restore said arms clockwise to untripped position, as here shown, where the stud 272 is engaged by the transfer trip pawl 273. Immediately after the arms 270 have been restored, the studs 315 and 321 move beyond the ends of the corresponding arms 316 and 322, thus releasing the shaft 314 (Fig. 20) to the action of a spring (not shown), which immediately restores said shaft and the rod 312 clockwise to normal position, as shown here. Return movement clockwise of the engaging shaft 231 (Fig. 26) causes the studs 315 and 321 to by-pass the downward extensions of the corresponding arms 316 and 322, in preparation for subsequent operation of the transfer restoring mechanism.

Balance totalizer alining mechanism

An alining mechanism, which cooperates with the teeth of the auxiliary totalizer whels 203 (Figs. 7, 20 and 22) is provided for alining said wheels and their companion main totalizer wheels 202 to insure that the teeth of said main wheels are properly engaged with the teeth in the corresponding amount actuator racks 197 and transfer segments 262.

The alining mechanism comprises two rods 327 for coacting with the teeth of the auxiliary totalizer wheels 203, which rods are rotatably supported by a series of similar arms 328, in turn pivotally supported by studs 329 secured in the corresponding order plates 260. The rods 327 are engaged by slots 330 in a series of operating arms 331 secured on the aliner shaft 232, said arms maintaining said rods 327 in axial alinement as they are moved into and out of engagement with the teeth of the auxiliary totalizer wheels 203. Secured on the righthand end of the shaft 232 (Fig. 26) is a crank 332 pivotally connected by a link 333 to the upper end of an arm 334 free on a stud 335 supported by brackets depending from the base 52 (Fig. 5A). The arm 334 is connected by a stud 336 to a cam lever 337 free on the stud 335, and carrying rollers 338 and 339, which cooperate, respectively, with the peripheries of companion plate cams 340 and 341, secured on the main cam shaft 185 which, as previously explained, makes one clockwise revolution (Fig. 26) each machine operation. Also secured on the righthand end of the shaft 232 (Figs. 7 and 26) is an aliner 342, having teeth which coact with alining disks 343 mounted on the righthand end of the shaft 204, said aliner coacting with said disks to aline the selected set of wheels 202 or 203 with the corresponding amount actuators 197.

Near the beginning of machine operation, rotation of the cams 340 and 341 (Fig. 26) rocks the lever 337 and the arm 334 clockwise, which movement through the link 333, rocks the crank 332, shaft 232, and aliner 342, counter-clockwise to disengage said aliner from the disks 343 to free the totalizer shaft 204 for horizontal selecting movement. Simultaneously with the disengaging of the aliner 342, counter-clockwise movement of the shaft 232 and the arms 331 (Figs. 20 and 22) rocks the rods 327 downwardly or counter-clockwise into engagement with the teeth of auxiliary totalizer wheels 203 to retain said wheels and their companion main wheels 202 in proper alinement while the totalizer is being shifted horizontally to select the proper wheels for engagement with the amount actuators. Prior to initial movement rearwardly of the amount actuators 197, the cams 340 and 341 (Fig. 26) restore the lever 337 and arm 334 counter-clockwise, which, through the link 333 and crank 332 rocks the shaft 232 clockwise to reengage the aliner 342 with the alining disks 343, and to simultaneously disengage the rods 327 (Fig. 20) from the teeth of the auxiliary wheels 203, to free said wheels for actuation by the amount actuators 197.

Homing mechanism

A spring-actuated homing mechanism is provided for yieldingly retaining the engaging shaft 231 (Figs. 7, 10 and 29) at the extremes of its movement in either direction. Secured on the lefthand end of the engaging shaft 231 is a homing cam 344, the working edge of which coacts with a roller 345 mounted on an arm 346 free on a stud 347 secured in an engaging shaft support plate 348 secured to the base 52 and to the left main frame 51. A comparatively strong spring 349, tensioned between the arm 346 and a stud secured in the plate 348, urges said arm 346 clockwise to normally maintain the roller 345 in firm yielding engagement with the working surface of the cam 344. The contour of the working surface of the cam 344 is such that the roller 345, coacting therewith, under influence of the spring 349, yieldingly maintains said cam and the shaft 231 in either extremes of their rocking movement. The plate 348 (Fig. 7) in addition to supporting the arm 346, likewise rotatably supports the lefthand end of the engaging shaft 231 for the balance totalizer.

Figitive one mechanism

In a balance or overdraft totalizer of the type described above, it is necessary to provide what is termed a "fugitive 1" mechanism for correcting the algebraic condition of the totalizer wheels 202 when said wheels become overdrawn, or change from a postive to a negative condition. An overdraft in the balance totalizer causes the highest order wheel to be rotated in a subtractive direction from zero to 9 position, and during this rotation the long tooth on said wheel trips a corresponding latch 273 (Figs. 21, 22 and 23), which frees a corresponding transfer arm 270 for actuation by its spring 275, in the same manner as explained in connection with the lower orders of the totalizer. Operation of the arm 270 rocks the corresponding latch 265 out of engagement with a locking notch in a fugitive 1 operating segment 350 pivoted on a corresponding stud 263 secured in the corresponding plate 264 (Fig. 20). The segment 350 operates similarly to the transfer segment 262, explained in connection with Fig. 20, and carries a corresponding one of the studs 283, to which is connected one end of a corresponding operating spring 284, the other end of which is connected to the bail 285.

In subtract operations, the bail 285 is in the lefthand position (Fig. 21) shown in dot and dash lines, and disengaging of the latch 265 from the notch in the segment 350 frees said segment for operation under influence of the spring 284, and said segment is operated in a clockwise direction, the same as explained for the transfer segments 262 in subtract operations. The stud 283 carried by the segment 350 coacts with opposite walls of a notch 351 in an arm 352, pivoted on the stud 263 for the segment 350. An upward hook-shaped extension of the arm 352 is connected by a link 353 to a crank 354, secured on an overdraft control shaft 356 journaled in the plates 215, 216, 217, and 348 (Fig. 7). The overdraft control shaft 356 extends through the totalizer framework, and has secured on its righthand end (Figs 7 and 23) a crank 357, connected by a link 358 to an arm 359 rotatably supported by the stud 263, which forms the pivot for a lowest order transfer segment 360, similar in outline and function to the transfer segments 262, and having teeth which coact with the teeth of the lowest order main totalizer wheel 202 for the purpose of transferring fugitive 1 digits into said lowest order wheel. The parts 357, 358 and 359 are similar in outline and function to the corresponding parts 354, 353 and 352, and operate in conjunction with said parts to transfer fugitive 1 digits into the lowest order wheel 202. The segment 360 (Figs. 22 and 23) carries one of the studs 283, and another stud 362 which engage opposite walls of a notch 361 in the arm 359, to form an operating connection between said arm and said segment.

Secured on the righthand end of the overdraft shaft 356 (Fig. 26) is a toggle lever 363 having a slot in its lower end engaged by a stud in the upper end of a companion toggle lever 364 free on a stud 365 secured in the plate 215. A spring 366 is connected between the upper end of the lever 363 and the lower end of the companion lever 364 to form a yieldable over-center connection, which maintains the overdraft shaft 356 at the extremes of its movement in either direction.

Clockwise movement of the segment 350 (Fig. 21) under influence of the spring 284, causes the stud 283, in cooperation with the forward wall of the notch 351, to rock the arm 352 also clockwise. Said arm in turn, through the link 353, rocks the crank 354, shaft 356, and crank 357 (Figs. 22 and 23), in a counterclockwise direction. Counterclockwise movement of the crank 357, through the link 358, rocks the lowest order arm 359 clockwise, causing the rearward shoulder in the notch 361, coacting with the stud 362, to rock the segment 360 also clockwise. Clockwise movement of the segment 360 rotates the lowest order wheel 202 the equivalent of one tooth space in a subtractive direction to correct the algebraic condition of said wheel so that in overdraft sub-total and total operations a true negative balance will be printed on the record material.

If subsequent to an overdraft in the balance totalizer, a large enough sum is added into said totalizer to overcome the overdraft, the long tooth on the highest order wheel 202 will again trip the pawl 273 (Fig. 21) to free the segment 350 for operation by the spring 284, as explained above. In this case, the spring 284 and bail 285 are in adding position, as shown in full lines in Fig. 21, and consequently, said segment 350 will be operated thereby in a counterclockwise direction. Counterclockwise operation of the segment 350 will cause the stud 283 to return the arm 352 also counterclockwise, which movement, through the train of mechanism described above, will be imparted to the lowest order arm 359 (Figs. 22 and 23), and said arm will be returned counterclockwise in unison therewith. Return movement counterclockwise of the arm 359 will cause the notch 361, in cooperation with the stud 283, to rotate the segment also in a counterclockwise direction to advance the lowest order wheel 202 the equivalent of one tooth space in an additive direction to correct the algebraic condition of said lowest order wheel when the balance totalizer again becomes positive.

Overdraft control of automatic machine release

Mechanism controlled by the algebraic condition of the balance or overdraft totalizer is provided for rendering the automatic machine releasing mechanism inoperative when the balance totalizer is in an overdrawn condition, so that this condition will be called to the attention of the operator.

Secured on the righthand end of the overdraft shaft 356 (Fig. 26) is a hook 368, arranged to cooperate with a shoulder 369 formed on a slide 370 shiftably mounted by means of a slot near the rearward end thereof in cooperation with the engaging shaft 231, and by means of a slot in its forward end, which engages a stud 371 secured in the right main frame. The slide 370 carries a stud 372 which coacts with the upper end of a cam lever 373 free on the stud 335, and having a forward extension which carries a roller 374, which coacts with the periphery of a plate cam 375 secured on the main cam shaft 185. A spring 376 urges the slide 370 forwardly, which through the stud 372 and the lever 373, maintains the roller 374 in yielding engagement with the periphery of the cam 375. A lever 377 (Fig. 26) is pivotally connected at its rearward end to the slide 370. An upward extension of the lever 377 carries a stud 378 which engages a vertical slot in a release bar 379, the lower end of which is pivotally connected to a machine release lever 380, which is in turn operatively connected to the main clutch, for connecting the machine operating mechanism to the operating motor. A downward extension of the lever 377 carries a stud 381 which engages a horizontal slot in a slide 382 shiftably mounted by means of horizontal slots therein, in cooperation with fixed studs. A spring 383 urges the slide 382 forwardly to normally maintain a camming surface on the forward end thereof in yielding engagement with a stud 394 fast in the stem of the Non-Auto key 107 (Figs. 1 and 2). The upper end of the bar 379 has a shoulder 385 which coacts with a lever 367 which is operated by the traveling carriage 54 (Fig. 1) in preselected columnar positions thereof.

When the traveling carriage operates the lever 367 (Fig. 26), said lever, in coaction with the shoulder 385, lifts the bar 379 to rock the lever 380 counterclockwise to engage the main clutch mechanism to cause the machine to perform a cycle of operation. The automatic machine releasing feature may be rendered inoperative by depressing the Non-Auto key 107, which causes the stud 384, in cooperation with the camming surface on the slide 382, to shift said slide rearwardly against the action of the spring 383, to shift the lever 377 and slide 370 rearwardly, against the action of the spring 376. Rearward movement of the lever 377, through the stud 378, rocks the bar 379 clockwise, to move the shoulder 385 out of the path of the lever 367, so that operation of said lever by the traveling carriage will not lift said bar 379, and consequently the automatic release feature of the machine will be disabled. The Non-Auto key 107 is latched in depressed position, and remains thus latched until the release key 112 (Figs. 1 and 2) is depressed to free said key to the action of its spring, which immediately restores said key upwardly to undepressed position.

Soon after machine operation is initiated, rotation of the cam 375 (Fig. 26) rocks the lever 373 clockwise to shift the slide 370 rearwardly to move the shoulder 369 beyond the hook 368, and near the end of machine operation said cam 375 permits the spring 376 to restore the slide 370 forwardly to normal position as here shown, in which the shoulder 369 is out of the path of the hook 368. The initial movement rearwardly of the slide 370 shifts the lever 377 in unison therewith, causing said lever to rock the bar 379 clockwise to move the shoulder 385 out of the path of the lever 367, and it is during the time that said slide 370 and the bar 379 are in their rearward positions that actuation of the balance totalizer takes place.

If an overdraft occurs in the balance totalizer while it is being actuated, the overdraft shaft 356 and the hook 368 are rocked counterclockwise from the position here shown (Fig. 26), as previously explained, which movement moves the hook 368 into the path of the shoulder 369 to obstruct return movement forwardly of the slide 370, the lever 377, and the bar 379, under influence of the cam 375 and the spring 376. This retains the shoulder 385 on the bar 379 out of the path of the lever 367, and consequently automatic operation of the machine is disabled to call the overdrawn condition of the balance totalizer to the attention of the operator. If subsequently to being overdrawn the balance totalizer changes to a positive condition, the overdraft shaft 356 is returned clockwise to move the hook 368 out of the path of the shoulder 369 to again enable the automatic releasing feature of the machine.

If further description of the automatic machine releasing mechanism is required, reference may be had to Figs. 92 and 141, and the description in connection therewith of the Christian Patent No. 2,626,749.

Shifting mechanism for overdraft totalizer

It will be recalled, by referring to Figs. 7 and 20, that in all operations except overdraft, sub-total, and total operations, often referred to as overdraft total-taking operations, the main wheels 202 of the balance or overdraft totalizer are in alinement with the amount actuators 197, for actuation thereby. When the balance totalizer is overdrawn, a condition is set up whereby selecting said overdraft totalizer for a sub-total or total operation, either by means of the traveling carriage in pre-selected columnar positions thereof, or by means of the balance totalizer control keys, causes the balance totalizer shaft 204 and the auxiliary shaft 207 to be shifted toward the right, as viewed in Fig. 7, to aline the auxiliary wheels 203 with the amount actuators 197, for actuation thereby. The mechanism for shifting the balance totalizer in overdraft total-taking operations is best shown in Figs. 7, 10, 12 and 14, and will now be described.

The shaft 204 for the main totalizer wheels 202 is threaded on its left end to receive companion threaded shifting disks 386 and 387, the outer faces of which coact, respectively, with totalizer shifting studs 388 and 389, mounted in companion shifting arms 390 and 391 (Fig. 14) pivotally mounted on studs 392 and 393 secured in a support plate 394 (Fig. 7) which is secured to the machine base 52, and properly spaced therefrom by means of several shoulder hubs 396, only one here shown. Proper adjustment of the shifting disks 386 and 387, in relation to the corresponding shifting studs 388 and 389, may be obtained by turning said disks in one direction or the other, and after said disks have been properly located they may be secured against displacement by means of corresponding lock nuts 397 (Fig. 7). The upper ends of the studs 392 and 393 extend into corresponding holes in a top support plate 395, similar in outline to the bottom plate 394, and said top plate assists said bottom plate 394 in rigidly supporting the totalizer shifting mechanism. The studs 388 and 389 (Figs. 9, 10, 12, and 14) in the arms 390 and 391 extend downwardly through said arms and through a clearance opening in the plate 394, and pivotally support, respectively, sensing levers 398 and 399. A spring 400, tensioned between the arms 390 and 391, urges said arms in opposite directions, that is, clockwise and counter-clockwise, respectively, as viewed in Fig. 14, to normally maintain undercut surfaces on the outer edge of the sensing lever 398 in yielding contact with stop studs 401 and 402 depending from the bottom surface of the plate 394, and to normally maintain similar undercut surfaces on the lever 399 in yielding engagement with corresponding stop studs 403 and 404 also depending from the bottom surface of the plate 394. Depending from the arms 390 and 391 are respective operating studs 405 and 406, arranged to be engaged by operating surfaces on a yoke 407 (Figs. 12 and 13) pivotally supported at its center on a stud 408 carried by an operating slide 409 shiftably mounted by means of longitudinal slots 410 therein, in cooperation with screw studs 411 (Figs. 8, 10 and 13) secured in the machine base 52. The slide 409 is shiftably supported between the heads of the screws 411 and finished surfaces on pads formed on the base 52. A right-angled forward portion of the slide 409 (Fig. 8) carries a stud 412, which engages a slot in a cam lever 413 free on the stud 249 and carrying rollers 414 and 415, which coact, respectively, with the peripheries of companion plate cams 416 and 417, secured on the main cam shaft 185. A spring 418 urges the slide 409 forwardly to take up any lost motion existing between said slide, the lever 413, and the cams 416 and 417, and to absorb any shock resulting from the shifting of the totalizer from one position to another.

The sensing lever 398 has on opposite ends thereof sensing fingers 421 and 422 (Fig. 14), and the sensing lever 399 has on opposite ends thereof sensing fingers 423 and 424. The sensing fingers 421 and 423 coact with the periphery of a selecting cam 425 carrying a stud 426, journaled in a hub depending from the plate 394 (Fig. 10). The fingers 422 and 424 (Fig. 14) coact with the periphery of a selecting cam 427 carrying a stud 428 journaled in a hub depending from the plate 394. In this case the selecting cam 427 is not positionable, and remains in the position here shown at all times, in which position it is anchored by a stud 429 extending from said cam to the plate 394. The selecting cam 425 is positionable either under control of the traveling carriage in pre-selected columnar positions thereof, or under control of the control keys for the overdraft totalizer. The cam 425 carries a stud 430 (Figs. 10, 12 and 14) which is freely engaged by a hole in the flattened rearward end of a wire link 431, the forward end of which is pivotally connected by a stud 432 (Fig. 30) to the downward end of a lever 433 pivoted on the rod 240. A spring 434 urges the lever 433 counter-clockwise to normally maintain an arcuate surface 435 on the forward edge thereof in yielding contact with a roller 436 (Fig. 10) carried by a lever 437 free on the stud 249. A comparatively strong spring 438 urges the lever 437 counter-clockwise to normally maintain a roller 439 carried thereby in yielding contact with the periphery of a plate cam 440 secured on the main cam shaft 185. The lever 433 (Fig. 30) has a forward extension with a shoulder 441, which coacts with a square stud 442 in the lower end of a lever 443 free on a rod 444 supported in the machine framework. A spring 445 urges the lever 443 counter-clockwise to normally maintain a stud 446 carried thereby in yielding contact with a shoulder formed on an arm 447. The arm 447 is free on the rod 444, and has a slot which engages a stud 448 in one arm of a yoke 449 free on a rod 450 supported by the machine framework. The other arm of the yoke 449 has an extension 451, which overlies and coacts with a lefthand end of a sensing lever 452, which is connected to the corresponding sensing finger 75 (Figs. 5A and 32) which, as previously explained, coacts with the control plates 74, to control the functions in the overdraft totalizer.

A wire link 454 (Fig. 30) pivotally connects the lever 433 to a downward extension of a lever 455 free on the shaft 231, and having a bent-over extension 456 on its upper end, which coacts with a peripheral surface 457 on a stop arm 458 fast on the overdraft shaft 356. As shown in Fig. 30, the stop arm 458 and the overdraft shaft 356 are in plus or positive position, and in this position the surface 457, in cooperation with the extension 456, obstructs counter-clockwise movement of the levers 455 and 433, under influence of the spring 434, when the cam lever 437 (Fig. 10) is operated at the beginning of machine operation, by the cam 440, and in this case, no shifting movement will be imparted to the overdraft totalizer. Therefore, it should be evident that regardless of what type of machine operation is initiated, whether under control of the traveling carriage or the overdraft totalizer control keys, no shifting movement will be imparted to the overdraft totalizer shafts 204 and 207 as long as the balance totalizer is not overdrawn, and consequently the plus wheels 202 will remain in alinement with their corresponding amount actuators 197. Upon the occurrence of an overdraft in the overdraft or balance totalizer, the shaft 356 and arm 458 are rocked clockwise (Fig. 30) to the position shown in dot and dash lines, to move the surface 457 beneath and out of the path of the extension 456 to free the levers 455 and 433 for counter-clockwise movement upon initial operation of the cam lever 437 (Fig. 10).

As previously explained, the sensing lever 452 (Figs. 30 and 32) is connected to the corresponding one of the sensing fingers 75 which sense the lower edge of corresponding control plates 74 mounted in the control stops 73 which, as previously explained, may be arranged in any desired pattern along the bar 72 (Fig. 5A) to agree with the columnar divisions of the record material being used in a particular business system. The control plates 74, which coact with the finger 75 (Fig. 32) for the overdraft totalizer, may be arranged in four lengths, to control the different functions in said overdraft totalizer.

The longest or "T" length control plate conditions the overdraft totalizer for a total-taking operation, the next longest or "S" length conditions the overdraft totalizer for a subtract operation, the next or "A" length conditions the overdraft totalizer for an adding operation, and the shortest or "O" length conditions the balance totalizer for a non-adding operation. The "T" or longest length control plate 74 in cooperation with the sensing finger 75, retains the lever 443 (Fig. 30) and square stud 442 in their clockwise positions, as here shown, to hold said stud out of the path of the shoulder 441, so that the lever 433 is free to rock counter-clockwise upon initial movement of the lever 437 (Fig. 10) provided the balance totalizer is in an overdrawn condition, in which the arm 458 is out of the path of the extension 456. Initial counter-clockwise movement of the lever 433, under influence of the spring 434, through the link 431 (Figs. 10 and 14) rocks the selecting cam 425 counter-clockwise to move control surfaces 459 and 460 thereon into coacting relationship with the fingers 421 and 423 of the sensing levers 398 and 399. Immediately thereafter initial movement forwardly of the slide 409 (Figs. 8 and 13) under influence of the cams 416 and 417, and through the yoke 407, rocks the arms 390 and 391 (Fig. 14) and the studs 388 and 389 carried thereby inwardly, to cause the sensing levers 398 and 399 to sense the cams 425 and 427 to position said studs according to the contour of said cams. The studs 388 and 389 (Figs. 10, 12 and 14), in cooperation with the corresponding disks 386 and 387, shift the balance totalizer shaft 204 toward the right, as viewed in Fig. 7, to move the main wheels 202 out of alignment with the actuators 197, and to simultaneously move the corresponding auxiliary wheel 203 into alinement with said actuators 197.

Any control plate 74 (Figs. 30 and 32) which is shorter than the "T" length, permits sufficient movement of the sensing finger 75 to rock the arm 447 and lever 443 counter-clockwise, under control of the spring 445, a sufficient distance to move the square stud 442 over the shoulder 441, to obstruct counter-clockwise movement of the lever 433, and consequently in this case, even if the balance totalizer is in an overdrawn condition, movement of the lever 433 will be obstructed, and as a result the main wheels 202 of the balance totalizer will remain in alinement with the amount actuators 197.

Mechanism controlled by the Total key 115 for the overdraft totalizer (Figs. 1 and 2) is provided for blocking counter-clockwise movement of the lever 443 (Figs. 30 and 33) to retain the square stud 442 out of the path of the shoulder 441, regardless of what length control plate 74 (Fig. 32) is in coacting relationship with the sensing finger 75. This mechanism includes a shoulder 463 on the lever 443 which coacts with a finger 464 fast on a shaft 465 journaled in the machine framework. The shaft 465 has secured thereon a crank 466 (Fig. 33), which is pivotally connected by a link 467 to an arm 468 free on a stud 469, secured in the left main frame 51. The arm 468 has a cam slot 470, which coacts with a stud 471 secured in the stem of the Total key 115 for the overdraft or balance totalizer. Depression of the key 115 causes the stud 471, in cooperation with the slot 470 to rock the arm 468 clockwise, which movement, through the link 467, is imparted to the crank 466, the shaft 465 and finger 464, to move said finger into the path of the shoulder 463, to block counter-clockwise movement of the lever 443 (Fig. 30) under control of the traveling carriage, and to retain the stud 442 out of the path of the shoulder 441. This permits initial movement counter-clockwise of the lever 433, in case an overdraft in the balance totalizer has moved the arm 458 out of the path of the extension 456, to cause the balance totalizer shaft 204 to be shifted toward the right (Fig. 7) to aline the auxiliary totalizer wheels 203 with the amount actuators 197 in overdraft total operations.

When the lever 433 (Fig. 30) is retained against initial movement counter-clockwise, the cam 425 is positioned as shown in Fig. 14, so that control surfaces 461 and 462 on said cam are in coacting relationship with the fingers 421 and 423 of the sensing levers 398 and 399, whereupon forward movement of the slide 409 (Fig. 13) causes the studs 388 and 389, in cooperation with their corresponding disks 386 and 387 (Fig. 7) to position the shaft 204, as here shown, so that the main totalizer wheels 202 will be in alignment with the amount actuators 197.

Function reversing mechanism

Mechanism controlled by initial movement counter-clockwise of the lever 433 (Fig. 30) is provided for reversing the adding and subtracting functions in the selected group totalizer in overdraft total-taking operations. The forward edge 472 of the lever 433 coacts with a stud 473 carried by a link 474 pivotally connected at its rearward end to an arm 475 free on the rod 240. The forward end of the link 474 is pivotally connected to a crank 476 fast on a shaft 477 journaled in the machine framework, and also having secured thereon an arm 478 with a slot in its forward end which embraces a stud 479 in a lever 480 free on a rod 481 supported by the machine framework. A forward extension of the lever 480 coacts with a stud 482 carried by a reverse mechanism operating arm 483 free on the shaft 481. The stud 482 and the arm 483 are the equivalents of the corresponding parts 1991 and 1992, illustrated in Figs. 56 and 57 of the Christian Patent 2,626,749, and function exactly like said parts to control the reversing of the adding and subtracting functions in the selected group totalizer. Initial movement counter-clockwise of the lever 433 (Fig. 30) causes the surface 472, in cooperation with the stud 473, to shift the link 474 forwardly. Forward movement of the link 474 rocks the crank 476, shaft 477, and arm 478 clockwise, against the action of a spring 484. Clockwise movement of the arm 478 rocks the lever 480 counter-clockwise, said lever in turn rocking the stud 482 and the arm 483 also counter-clockwise to reverse the adding and subtracting functions in the selected group totalizer in the manner explained in the Christian patent referred to above.

The Reverse key 121 (Figs. 1 and 2) is connected to and operates the arm 483 in exactly the same manner as explained in connection with Figs. 46 and 57 of the Christian patent, to provide means for manually controlling the reversing feature in the group totalizers whenever desirable.

Ribbon shift control

In overdraft total-taking operations it is desirable to have the positive amount of the overdraft printed in a distinctive color, such as red, so that it may be readily identified as an overdraft item, and this is effected automatically under control of the lever 433 (Fig. 30) during its initial movement counter-clockwise. Secured on the shaft 477 is an arm 486 having a forward extension which underlies a stud 487 (Fig. 10) in a ribbon shifting control slide 488 mounted for vertical shifting movement in the machine framework. Initial movement forwardly of the lever 433 rocks the shaft 477 and the arm 486 clockwise in the manner explained before, to withdraw the forward extension thereof from the stud 487 to free the slide 488 to the action of a spring (not shown) which immediately shifts said slide downwardly, whereupon said slide, in the usual and well known manner, controls the inking ribbon lifting mechanism to cause the ribbon to be lifted to a position where the red printing field thereof will be opposite the printing sectors to cause the amount of the overdraft total to be printed in red, so that it may be readily identified.

Control of balance totalizer by add and subtract keys

The operation of the lever 433 (Fig. 30) is further controlled by the Add and Subtract keys 113 and 114

(Figs. 1 and 2) for the overdraft totalizer, when said totalizer is in an overdrawn condition, to insure that said lever 433 is retained against counter-clockwise movement in such operations so that the main totalizer wheels 202 (Fig. 7) will remain in alinement with the amount actuators 197. Secured on the shaft 477 (Figs. 10 and 30) is an arm 489, having a foot-shaped forward extension 490, which coacts with a square stud 491 secured in a lever 492 free on the rod 481. The lever 492 carries a stud 493, which coacts with a rearward extension 494 on a control slide 495, which is shifted rearwardly by the Add key 113 and the Subtract key 114 for the overdraft totalizer, when said keys are depressed. Rearward movement of the slide 495, upon depression of either the Add key 113 or the Subtract key 114, rocks the lever 492 clockwise to move the square stud 491 beneath the foot-shaped extension 490. This obstructs clockwise movement of the arm 489, the shaft 477, and the crank 476, causing said crank, through the link 474 and stud 473, to obstruct initial movement counter-clockwise of the lever 433 when either of these keys is depressed, regardless of the positioning of the lever 443 (Fig. 30) by a "T" length control plate 74 (Fig. 32) as explained above, to insure that the main wheels 202 of the balance totalizer remain in alinement with the amount actuators when adding and subtracting functions are carried on in said balance totalizer at the time it is in an overdrawn condition.

The obstructing of clockwise movement of the shaft 477 and arm 478, as explained above, also prevents operation of the reversing mechanism when adding and subtracting functions are carried on in the balance totalizer, when it is in an overdrawn condition. Likewise, obstructing of clockwise movement of the arm 486 also retains the slide 488 (Fig. 10) in its upward position, to prevent the shifting of the inking ribbon to red printing position. However, in some cases it is desirable that all subtract items be printed in red, and if desirable, the Subtract key 114 may be arranged to cause the inking ribbon to shift to red printing position, so that all subtract items in the overdraft totalizer will be printed in red.

What has been said above concerning total of overdraft operations applies equally as well to sub-total of overdraft operations, as the mechanism under control of the Total key 115 operates in exactly the same manner in sub-total of overdraft operations that it does in total of overdraft operations, the only difference being that the Sub-Total key 116 controls mechanism which causes the auxiliary wheels 203 of the overdraft totalizer to remain in engagement with the corresponding amount actuators 197 during their return movement forwardly to restore said wheels and their corresponding main totalizer wheels 202 to their orignal position. When the Sub-Total key 116 is not used in conjunction with the Total key 115 the auxiliary wheels 203 are disengaged from the actuators 197 prior to their return movement, and consequently, said wheels and their corresponding main totalizer wheels 202 remain in a zeroized condition.

*Group totalizer mechanism*

As mentioned previously, the present machine is provided with a group or storage totalizer framework 210 (Figs. 5A and 5B) which in the present adaptation supports four sets of group or storage totalizer wheels 208, each set comprising a wheel 208 for each denominational order, mounted on the tubular shaft 209 which, like the overdraft totalizer shaft 204, may be shifted horizontally in the framework 210 to aline the selected set of wheels 208 with the amount actuators 197 for actuation thereby. While the present machine is provided with four sets of storage or group totalizer wheels 208, it is possible to have eight sets of wheels on the shaft 209, and as previously explained, another group totalizer framework 212 may be provided, which may also carry eight sets of group totalizer wheels 211, said totalizer 212 being similar in every respect to the group totalizer 210.

The group totalizer 210 is provided with engaging and disengaging mechanism for shifting the totalizer framework up and down to engage and disengage the selected set of wheels 208 and the amount actuator racks 197 in proper timing for the type of operation being performed. The group totalizer framework 210 (Fig. 5B) is shifted up and down to engage and disengage the selected set of totalizer wheels 208 and the amount actuators 197 by mechanism which is similar in every respect to the engaging and disengaging mechanism described for the balance totalizer, and therefore said engaging and disengaging mechanism for the group totalizer will be described in less detail than the corresponding mechanism for the balance totalizer.

The engaging and disengaging mechanism for the group totalizer 210 includes an engaging and disengaging shaft 498 (Figs. 5B, 10, 16 and 29) having secured thereon a crank 499 pivotally connected by a link 500 to an arm 501, similar to the arm 239 for the overdraft totalizer.

The arm 501 (Fig. 29) has pivotally connected thereto a pitman 502, which carries a corresponding engaging and disengaging hook 503, said pitman and said hook coacting with the engaging and disengaging bar 245 in exactly the same manner as explained for the corresponding parts 241 and 243 (Fig. 10) for the overdraft or balance totalizer. The hook 503 for the group totalizers, is controlled by a lever, similar in every respect to the lever 254 for the balance totalizer, the positioning of said lever in turn being controlled by the traveling carriage in preselected columnar positions thereof in adding, subtracting and total-taking operations. Also the total-taking functions in the group totalizers may be controlled by the Total key 118 (Figs. 1 and 2) which is used alone to condition the selected group totalizer for a total operation, and is used in conjunction with the Sub-Total key 116 for conditioning the selected group totalizer for a sub-total operation. The engaging shaft 498 (Figs. 16 and 17) is connected by a plurality of cranks 497 to a totalizer engaging rod 504, which coacts with cam slots in the end and intermediate totalizer plates to impart engaging and disengaging movement to the selected set of group totalizer wheels 208 in the same manner as explained in detail for the balance totalizer.

Each denominational order, with the exception of the lowest order of the group totalizer wheels 208, is provided with a corresponding tens transfer segment 505, which is actuated by a spring 506 connected between said segment and a spring bail 507 which is shifted from adding to subtracting position and vice versa, in exactly the same manner as explained for the corresponding bail 285 (Fig. 20) for the overdraft totalizer.

The transfer segment 505 is retained against transfer movement under influence of the spring 506 by a corresponding latch 508, which is disengaged by a corresponding arm 509, when the adjacent lower wheel 208 passes through zero and the long tooth thereon engages the tooth of a corresponding platch plate 510 connected to a corresponding trip pawl 511 free on an add-subtract control shaft 513, and rocks said pawl out of engagement with a stud in the arm 509 to free said arm to the action of its operating spring, as shown in Fig. 18. The plate 510 is shifted from adding to subtracting position and vice versa, by means of a shifting finger 512 secured on the shaft 513, which is journaled in the group totalizer framework, and is shiftable up and down in unison with the totalizer shaft 209 and wheels 208 (Fig. 16).

The transfer control shaft 513 is shifted from adding to subtracting position and vice versa, through the medium of a slide 514, (Figs. 10 and 11) similar to the slide 297, and operatively connected to the shaft 498 by an arm, similar to the arm 299, secured on said shaft and carrying a stud which coacts with a slot in said slide 514. The slide 514 carries an operating arm 515, which coacts with studs in an arm 516, secured on the shaft 513. The arm 515 (Figs. 10 and 11) is positioned in relation to the studs in the arm 516, through the medium of a finger 517 on a group totalizer pitman 518, which is similar in outline to and operates like the corresponding pitman 304 for the balance totalizer, said pitman being controlled in its positioning by means of a control slide for the group totalizers, said slide not shown, but similar to the slide 308 (Fig. 11) for the overdraft totalizer.

The add-subtract control mechanism for the group totalizers is similar to and functions exactly like the corresponding mechanism for the overdraft or balance totalizer and it is, therefore, believed that the above brief description of said group totalizer mechanism will be sufficient.

In Figs. 10 and 11, the shafts 274 and 513, and their corresponding arms 292 and 516 are shown in subtract position. If the pitmans 304 and 518 are retained against forward movement by their corresponding control slides 308, the arms 295 and 515 will remain in the positions here shown, and consequently the shafts 274 and 513 will remain in subtract position. In adding and total-taking operations the control slides 308 move forwardly under control of either the traveling carriage or their respective control keys, and in so moving permit the pitmans 304 and 518 to move in unison therewith, whereupon the arms 295 and 515 are rocked clockwise to add conditioning position, and upon downward movement of the corresponding slides 297 and 514, rock the corresponding arms 292 and 516 and transfer control shafts 274 and 513 counter-clockwise, as viewed in Fig. 8, from subtract position to add position.

In Fig. 16 the group totalizer is shown in partially engaged position in adding operations, and in Fig. 17 said totalizer is shown in fully engaged position in such operations. Fig. 18 illustrates the tripping and the operation of the tens transfer mechanism in adding operations in the group totalizers, and Fig. 19 illustrates the tripping and the operation of the tens transfer mechanism in subtracting operations in the group totalizers.

The group totalizer is provided with a transfer restoring rod 519 (Figs. 16, 17, 18 and 19), which functions exactly like the corresponding rod 312 (Figs. 20, 21, 22, 23 and 24) for the overdraft totalizer, to restore the trip arms 509 to untripped position at the beginning of machine operation.

Selecting mechanism for group totalizers

The shaft 209 (Fig. 16), which rotatably supports the group totalizer wheels 208, is shiftable horizontally to aline the selected set of said totalizer wheels with the amount actuators 197 and the corresponding transfer segments 505. The mechanism to control the selective shifting of the shaft 209 is similar in many respects to the selecting mechanism described in connection with the balance or overdraft totalizer, and for that reason will be described in a somewhat briefer manner than said overdraft selecting mechanism.

The shaft 209 (Figs. 10, 12 and 15) for the group totalizers, is provided with shifting disks 520 and 521, which coact with corresponding shifting studs 522 and 523 carried by arms 524 and 525 free on studs 526 and 527 secured in the plate 394. The studs 522 and 523 extend through the corresponding arms and support corresponding sensing levers 528 and 529 having respectively, sensing fingers 530 and 531, and 532 and 533, for sensing control surfaces on corresponding control cams 534 and 535. The cam 534 is supported on the stud 428 and and is secured in fixed relationship to the corresponding sensing fingers 530 and 532 by a stud. The cam 535 is pivoted on a stud 536 supported by the plate 394 and the control surfaces thereon are positionable in relation to the corresponding sensing fingers 531 and 533 by means of the traveling carriage in preselected columnar positions thereof, and by means of the Total key 118 (Figs. 1 and 2) for the group totalizers. A spring 537 (Figs. 12 and 15) tensioned between the arms 524 and 525, urges said arms in opposite directions to normally maintain undercut surfaces on the backs of the levers 528 and 529 in yielding contact with respective stop studs 538 and 539 secured in the plate 394.

The levers 524 and 525 carry, respectively, studs 540 and 541, arranged to be engaged by operating surfaces on a yoke 542 (Fig. 13) free on a stud 543 fast in the slide 409. The slide 409 is moved first forwardly and back to normal position by the mechanism shown in Fig. 8, as explained before, and during its initial movement forwardly the yoke 542, in cooperation with the studs 540 and 541 rocks the arms 524 and 525 counter-clockwise and clockwise, causing the fingers on the sensing levers 528 and 529 to sense the control surfaces on the cams 534 and 535, and position the studs 522 and 523 accordingly. The studs 522 and 523 in turn coact with the disks 520 and 521 to shift the group totalizer shaft to aline the set of group totalizer wheels 208, corresponding to the effective control surfaces on the cams 534 and 535, with the amount actuators 197 and the transfer segments 505.

As mentioned previously, in the present arrangement, the cam 534 (Fig. 15) is fixed, and consequenty the sensing fingers 530 and 532 always coact with respective control surfaces 544 and 545 on said cam. On the other hand, the control cam 535 is positionable under control of the traveling carriage and consequently the sensing fingers 531 and 533 may coact with any of four respective control surfaces on said cam for selecting the four sets of group totalizer wheels 208. In cases where more than four sets of group totalizer wheels are carried on a single shaft, the cam 534 may also be arranged to be positioned to one or more positions under control of the traveling carriage in preselected columnar positions thereof, or under control of control keys for the group totalizers.

The mechanism for positioning the cam 535 (Figs. 10 and 15) comprises a wire link 546 pivotally connecting said cam to a lever 547 free on the rod 240. A hook shaped forward extension of the lever 547 has a slot which engages a stud 548 (Fig. 4) in a rearward extension of a lever 549 free on the stud 450. A forward extension of the lever 549 overlies and coacts with the left-hand end of a sensing lever 550 free on a stud 551 secured in a machine cross frame. A spring 555 urges the lever 547 counter-clockwise and the lever 549 clockwise to normally maintain the forward end of said lever 549 in yielding engagement with the lever 550. The lever 550 is urged counter-clockwise by a spring 552 (Fig. 3) to normally maintain a finished surface on the lower edge thereof in yielding contact with a sensing mechanism operating slide 553 mounted for vertical shifting movement in the machine. A righthand extension of the lever 550 is pivotally connected to the lower end of a sensing finger 554, the upper end of which coacts with corresponding control plates 74 (see also Fig. 1) carried by the stops 73 which as previously explained, are located in preselected columnar positions of the traveling carriage.

At the beginning of machine operation, the slide 553 moves downwardly (Fig. 3) to permit counter-clockwise sensing movement of the lever 550, under influence of the springs 552 and 555. This causes the tip of the finger 554 to sense the control surfaces on the effective control plate 74 to position said lever 550, the lever 549 and the lever 547 (Figs. 4 and 15) accordingly. The lever 547 through the link 546, in turn positions the selecting cam 535 in accordance with the control surface on the control plate 74.

As previously explained, the control plates 74 (Fig. 3) may have any one of four lengths, the longest being T or Total, the next longest being S or Subtract, the next A or Add, and the shortest length being O or Non-Add. The cam 535 (Fig. 15) has stepped control surfaces corresponding to the different lengths of control plates and marked accordingly. When a T length control plate 74 is opposite the upper end of the sensing finger 554, as shown in Fig. 3, no movement will be imparted to the levers 550 and 547 (Fig. 10) and consequently said lever 547, through the link 546, will position the selecting cam 535, as shown in Figs. 12 and 15 in which the corresponding control surfaces T—T thereon are opposite the sensing fingers 531 and 533 of the levers 528 and 529, and in this case, operation of the levers 524 and 525 by the slide 409 and the corresponding yoke 542 (Fig. 13) will cause the stud 522 and 523, in cooperation with their respective disks 520 and 521, to shift the totalizer shaft 209 to its extreme righthand position (Fig. 27) to aline the fourth or lefthand set of group totalizer wheels 208 with the amount actuators 197. In a like manner an S length control plate 74 (Fig. 29) will, through the group totalizer sensing mechanism, cause the control cam 535 to be positioned so that the control surfaces S—S thereon are opposite the fingers 531 and 533. Operation of the slide 409 and the yoke 542 (Fig. 13) will cause the sensing levers 528 and 529 to control the positioning of the disks 520 and 521 and the group totalizer shaft 209 (Figs. 7, 16 and 27) so that the third set of group totalizer wheels 208 thereon will be in alinement with the amount actuators 197. In a like manner an A length control plate will cause the second set of group totalizer wheels 208 to be alined with the amount actuators 197, and an O length control plate 74 will cause the first or righthand set of group totalizer wheels to be alined with the amount actuators 197 for coaction therewith in the type of operation, add, subtract, or total-taking, being performed in the selected group totalizer. Near the end of each machine operation, return movement upwardly of the slide 553 (Fig. 3) restores the lever 550 and connected mechanism to normal position against the tension of the springs 555 and 552.

*Aliner mechanism for group totalizers*

Fig. 27 is a fragmentary longitudinal view of the group totalizer shaft 209, showing the two lower denominational orders of the four sets of group totalizer wheels 208 and their corresponding actuators 197.

After the selected set of group totalizer wheels 208 has been alined with the corresponding amount actuators 197 in the manner explained above, said selected wheels are secured in alined position by a series of alining disks 556 secured on the righthand end of the group totalizer shaft 209, in coaction with alining teeth on an aliner 557, secured on an alining shaft 558 journaled in the group totalizer framework (Figs. 26 and 27). Also secured on the shaft 558 is a crank 559 pivotally connected by a link 560 to the crank 332 and link 333, for the balance totalizer aliner shaft 232.

Normally the teeth of the aliner 557 are in engagement with the disks 556 when the machine is at rest, and at the very beginning of machine operation the mechanism shown in Fig. 26 rocks said aliner counter-clockwise out of engagement with the disks 556, so that the shaft 209 and the group totalizer wheels 208 are free to be positioned in relation to the amount actuators 197 (Fig. 27). After the selected set of group totalizer wheels 208 has been alined with the amount actuators 197, as explained above, the aliner 557 is returned counter-clockwise into engagement with the disks 556 to aline and hold said selected set of wheels against displacement during machine operation.

The shaft 209 (Figs. 26 and 27) and the parts secured thereon, are retained or held against rotation by an arm 561 secured to said shaft, and having a slot which engages a guide stud 562 secured in the righthand plate 218. The sets of group totalizer wheels 208 (Figs. 16 and 27) which are not alined with the amount actuators 197, are held against rotation by a stationary alining bar 563 secured to the intermediate order plates for the group totalizers, which like the similar plates 260 (Fig. 21) for the balance totalizer, move up and down in unison with the shaft 209 and the group totalizer wheels 208. The alining bar 563 is provided with clearance slots 564, for each denominational order, which are in alinement with the corresponding amount actuators 197, so that the selected set of group totalizer wheels 208 are free to be revolved by said actuators and conversely, the non-selected sets of group totalizer wheels are held in set position against revolution. The tooth spaces of the wheels 208 are arranged to slide freely on the alining bar 563 when the group totalizer shaft 209 is shifted horizontally to select said wheels for engagement with the amount actuators 197.

The aliner shaft 558 (Figs. 16, 26 and 27) which as previously explained, moves up and down in unison with the group totalized shaft 209, has secured thereon a plurality of arms 565, which support an aliner bar 566, which operates in synchronism with the aliner 557 (Fig. 26) and coacts with the teeth of the group totalizer wheels 208 to retain said wheels against displacement while they are being moved into and out of engagement with the teeth of the corresponding amount actuator racks 197 and transfer segments 505.

*Automatic totalizer selection*

Mechanism controlled by the balance totalizer, when in an overdrawn condition, is provided for automatically selecting a particular set of group totalizer wheels 208 (Figs. 16 and 27) to receive the amount of the overdraft when an overdraft total-taking operation is performed in the balance totalizer.

Referring to Figs. 10, 28 and 30, it will be remembered that when the balance totalizer is in a positive condition the overdraft shaft 356 and the arm 458 are in the position shown here in full line, so that said arm will obstruct counter-clockwise movement of the levers 455 and 433 in the manner explained earlier. When the overdraft totalizer is in a negative or overdrawn condition, the overdraft shaft 356 and arm 458 are positioned as shown in Fig. 30 in dot and dash lines, so that said arm will not interfere with counter-clockwise movement of the levers 455 and 433.

The arm 458 carries a stud 568, which underlies and coacts with a stud 569 in a stop arm 570 free on the overdraft shaft 356. The arm 570 has a stop surface 571, which coacts with a bent-over extension 572 on the upper end of a lever 573, similar in outline to its companion lever 455, and free on the shaft 231. The lower end of the lever 573 is pivotally connected by a wire link 574 to the lever 547 which, as previously explained, controls the selection of the four sets of totalizer wheels 208 on the group totalizer shaft 209. An inner surface 575 on the arm 570 coacts with a stud 576 in an arm 577 free on the overdraft shaft 356 and pivotally connected by a link 578 to the lever 443 (Figs. 28 and 30) which, as previously explained, also obstructs counter-clockwise selecting movement of the lever 433 in all operations, except total-taking operations.

When the balance totalizer is in a plus condition the stud 568 (Fig. 28) in the arm 458, in cooperation with the stud 469, retains the stop arm 570 in its upward position, as here shown, in which the surface 571 is above and out of coacting relationship with the extension 572, and consequently said stop arm 570 will have no influence upon the levers 573 and 547 in their movement to select any one of the four sets of totalizer wheels on the group or storage totalizer line. When an overdraft occurs in the balance totalizer, the shaft 356 and arm 458 are moved to their downward or dot and dash position, as shown in Fig. 30, and in this position the stud 568, in cooperation with the stud 569 (Fig. 28) permits the stop arm 570 to move, by gravity, in a clockwise direction, to locate the stop surface 571 thereon opposite the extension 572 to control the extent of counter-clockwise selecting movement of said lever 573. This causes the lever 573, through the link 574, to also control the counter-clockwise selecting movement of the lever 547 to cause said lever, through the link 546 (Figs. 10 and 15) to position the cam 535 so that the corresponding control surfaces thereon are opposite the fingers 531 and 533 of the levers 528 and 529.

Operation of the arms 524 and 525, after the cam 535 has been positioned, as explained above, causes the studs 522 and 523, in cooperation with the disks 520 and 521 to properly control the horizontal shifting movement of the group totalizer shaft 209 (Fig. 27) to aline the second set of group totalizer wheels 208 thereon with the amount actuators 197, so that the result of overdraft total-taking operations will be entered in said second set of group totalizer wheels.

In case adding, subtracting and non-adding operations are carried on in the balance totalizer when it is in an overdrawn condition, it is desirable that the arm 570 (Figs. 28 and 30) be rendered ineffective to control the selecting movement of the group totalizer line, and this result is obtained in the following manner:

It will be recalled, by referring to Fig. 30, that the lever 443 is rocked counter-clockwise in adding, subtracting, and non-adding operations, to move the square stud 442 over the shoulder 441, to obstruct counter-clockwise shifting movement of the lever 433 and such movement of said lever 433, through the link 578 (Fig. 28) rocks the arm 577 counter-clockwise, causing the stud 576 in cooperation with the surface 575, to rock the arm 570 also counter-clockwise to move the stop surface 571 thereon out of the path of the extension 572, so that said stop arm will not interfere with positioning movement of the levers 573 and 547. The stud 576 in the arm 577 in cooperation with an inner surface 579 on a V-shaped extension of the stop arm 570, prevents overthrow of said arm when it is rocked counter-clockwise, either by the stud 576 or by the stud 568 in the arm 458.

From the foregoing it should be understood that when the balance or overdraft totalizer is in an overdrawn condition and a total-taking operation is performed therein, the second set of group totalizer wheels 208 will be automatically selected for engaging and disengaging with the amount actuators to receive the amount of said overdraft. In all other operations in the balance totalizer, when it is in an overdrawn condition, the automatic selecting mechanism will be rendered inoperative and the usual selecting mechanism, under control of the traveling carriage in preselected columnar positions thereof (Figs. 1 and 2), will control the selection of the group totalizers in the usual and normal manner.

As previously explained, the group totalizer shaft 209 (Fig. 27) may contain eight sets of totalizer wheels 208 and in this case, shifting of said totalizer shaft horizontally from one extreme position to the other may cause bounce or rebounding, which could possibly result in the stumbling of the aliner 557 on the alining disks 556 and in extreme cases may result in the wrong set of group totalizer wheels being alined with the amount actuators 197. To prevent the occurrence of this condition, an anti-rebound or snubbing device has been provided for the shaft 209 to eliminate any tendency of said shaft to rebound when it is shifted between extreme and all intermediate positions.

The shifting disk 521 on the shaft 209 (Figs. 10 and 9) is snugly embraced by fingers formed on the rearward edge of a snubbing plate 581, having two studs 582 each carrying a roller (not shown) which rollers engage a slot 583 formed in a bracket 584, secured by a screw 585 in a slot formed in a stud 586 secured to the outer face of a lefthand support plate 589 for the group totalizer shaft 209 which is similar in every respect to the corresponding lefthand plate 228 (Fig. 7) for the balance totalizer. A suitable elongated friction washer 587 (Fig. 9) is interposed between the upper surface of the plate 581 and the lower surface of the bracket 584, and a similar washer 587 bears against the upper surface of said bracket, said washers 587 having properly spaced holes which fit over the studs 582. Compressible springs, (not shown) fitting freely over each of the studs 582, are compressed between the upper washer 587 and nuts 588 threaded on the upper ends of the studs 582, and said springs may be properly compressed by said nuts to obtain the desired degree of friction between the washers 587 and the faces of the bracket 584, to secure the required snubbing action of the plate 581. As the shaft 209 and the disks 520 and 521 are shifted from one position to another, the assembly comprising the snubbing plate 581, washers 587, studs 582, and the compressible springs supported by said studs, slides along the bracket 584 to snub or dampen any tendency of the shaft 209 to rebound when it is moved from one extreme position to the other.

MODE OF OPERATION

It is believed that a full understanding of the operation of the machine of this invention will have been obtained from a perusal of the preceding specification. However, a brief description of operation will be given, using as an example the posting of individual checking accounts.

The machine is applicable to practically any type of business system where previous balances are picked up and entered in the crossfooter or balance totalizer, and amounts are added to and subtracted from the previous balance to arrive at a new balance which, if desired, may be entered in one of the group totalizers. Likewise, certain ones of the plus and minus amounts which are added to and subtracted from the previous balance may be simultaneously entered either positively or negatively in different ones of the group totalizers to maintain a separate total of these different items. A system of the nature outlined above may well be adapted for use by department stores, for example, and other retail businesses of a similar nature.

Another typical example of the use of the machine of this invention could be for the periodical posting of individual checking accounts by banking establishments. As a rule all active checking accounts are posted weekly, and in the posting of such accounts the previous balance is obtained from the customer's ledger card, set up on the amount keyboard and entered in the crossfooter or balance totalizer. This new balance may also be simultaneously entered in one of the group totalizers where a running total of the new balances is kept. Next, the checks issued by the customer against his account are subtracted from the previous balance and likewise the deposits made by said customer are added thereto and, as before, the checks or subtract items, may be simultaneously entered in one of the group totalizers to keep a running total of all debit items and also the deposits may be simultaneously entered in one of the group totalizers to keep a running total of all credit items. After all the check and deposit items have been entered in the balance totalizer, a total-taking operation is performed in the balance totalizer to obtain a new balance, which is simultaneously printed upon the customer's ledger card and, if desired, may be entered in one of the group totalizers so as to maintain a running balance of all new balances.

If during the computation of the customer's checking account the checks or debit items exceed the deposits or credit items an overdraft is created in the balance totalizer, this fact is made apparent to the operator by the disabling of the automatic machine releasing mechanism. However, if desired, the operator may continue with the posting of the particular checking account by using the manual release bars for initiating machine operations. If at the end of the posting of the customer's account, the account remains in an overdrawn condition, the performing of an overdraft total-taking operation in the balance totalizer will cause the true negative balance or overdraft to be printed upon the customer's ledger card and simultaneously, the mechanism shown in Fig. 28 will automatically select a particular one of the group totalizers to receive the amount of the overdraft total to maintain a running total of said overdraft totals.

From the foregoing rather brief description of the operation, it should be readily understood that the machine of this invention is very flexible in nature and may be adapted to most any type of business system where debits are subtracted from a previous balance and credits are added thereto and a new balance arrived at. Likewise, the different items involved in the computation of the various individual accounts may be distributed in the different sets of group totalizers to provide a grand total of all these items.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope and the spirit of the invention.

What is claimed is:

1. In a machine of the class described, having a balance totalizer, comprising a set of main totalizer elements and a set of auxiliary totalizer elements, said auxiliary elements geared to and operable in unison with the corresponding main elements, said main and auxiliary elements mounted in a shiftable framework, and a set of amount actuators for coacting with the main and auxiliary totalizer elements, the combination of a constant displacement device for shifting the framework to aline either the main or the auxiliary totalizer elements with the actuators; positionable means coacting with the constant displacement device to normally cause the main totalizer elements to be alined with the actuators, said positionable means positionable to cause the auxiliary totalizer elements to be alined with the actuators; yieldably-operated means to position the positionable means; means effective when the balance totalizer is in a positive condition to block operation of the yieldably-operated means to cause the main elements to be alined with the actuators; and means operable when the balance totalizer changes from a positive to a negative condition to move the blocking means to ineffective position to cause the auxiliary elements to be alined with the actuators and to coact therewith in overdraft total-taking operations to obtain a true negative total.

2. In a machine of the class described, the combination of a shaft constructed and arranged to be shifted in a plane parallel to its axis; a plurality of sets of totalizers mounted on the shaft; means including a single set of actuators to enter values into and to take values out of the different sets of totalizers; a pair of spaced-apart shifting disks mounted on the shaft; a pincher device comprising a pair of arms constructed and arranged to be closed the same extent each machine operation to yieldingly embrace the disks; means including a lever mounted on each arm and a positionable member coacting with said levers to selectively control the position in which the arms are closed in relation to the shifting plane of the shaft to selectively aline the different sets of totalizers with the single set of actuators for actuation thereby; and means to control the positioning of the positionable member.

3. In a machine of the class described, having a plurality of sets of totalizers mounted on a common shiftable support, and means including a single set of amount actuators to enter values into and take values out of the different sets of totalizers, the combination of a pair of spaced-apart shifting disks mounted on the totalizer support; totalizer-selecting means settable in positions corresponding to each of the totalizer sets; a support-positioning device comprising an arm for each disk, constructed and arranged to coact with the corresponding disk; and a lever mounted on each of the arms and engageable with the totalizer-selecting means, when the arms are operated, to cause said arms to coact with the disks to shift the support in accordance with the position of the totalizer-selecting means to aline the corresponding totalizer set with the actuators for actuation thereby.

4. In a machine of the class described, having a traveling carriage movable to various columnar positions, the combination of a shiftable shaft; a plurality of sets of totalizer elements mounted on the shaft; a single set of actuators for entering values into and taking values out of all the sets of totalizers; two spaced-apart disks mounted on the shaft; an arm for each disk; a stud on each arm for coacting with the disks; a lever mounted on each stud; a positionable member having positions corresponding to each set of totalizer elements, said member positionable by the traveling carriage in preselected columnar positions thereof; and yieldable means to operate the arms to cause the levers to embrace the positionable member and to cause the studs to embrace the disks to shift and position the shaft according to the position of the positionable member to select the different sets of totalizer elements for alinement with the actuators for actuation thereby.

5. In a machine of the class described, having a plurality of sets of totalizers mounted on a common shiftable support, and a single set of amount actuators to enter values into and take values out of the different sets of totalizers, the combination of two spaced-apart shifting disks mounted on the support; a pincher arm for each disk, each arm having a projection constructed and arranged to coact with the corresponding disk; means to operate the arms pincher-fashion to cause the projections to embrace the disks; levers mounted on the projections and movable in unison with said projections and the arms; and selectively-positionable means coacting with the levers to selectively adjust the arms and the projections as they are operated to aline any selected set of totalizers with the actuators for actuation thereby.

6. In a machine of the class described, having a plurality of sets of totalizers mounted on a shiftable shaft and a single set of amount actuators to actuate the different sets of totalizers, the combination of two spaced-apart shifting disks mounted on the shaft; an operating arm for each disk; a projection on each arm constructed and arranged to coact with the corresponding disk; compensating means to operate the arms to cause the projections to embrace the disks; a sensing lever mounted on each projection and movable by the compensating means in unison with said projections and the arms; and means including a selectively-positionable member movable to positions corresponding to the different sets of totalizers, said member coacting with the sensing levers to cause the compensating means to vary the positioning of the arms, the projections, the disks, and the shaft in accordance with the position of said member to aline the different sets of totalizers with the actuators for actuation thereby.

7. In a machine of the class described, having a plurality of sets of totalizers mounted on a shiftable shaft, a single set of actuators to actuate the different sets of totalizers, and a traveling carriage movable to various columnar positions, the combination of two spaced-apart disks mounted on the shaft; an operating arm for each disk; a projection on each arm constructed and arranged to coact with the corresponding disk; compensating means to operate the arms pincher fashion to cause the projections to embrace the disks; a sensing lever mounted on each projection; means including a member, said member having positions corresponding to the various sets of totalizers, said member engageable by the levers as the arms are operated pincher fashion to adjust said arms, the projections, the disks, and the shiftable shaft in accordance with the position of said member; and means controlled by the traveling carriage in preselected columnar positions thereof to position the member to cause any selected set of totalizers to be alined with the actuators for actuation thereby.

8. In a machine of the class described, having a balance totalizer comprising a set of main totalizer elements and a set of auxiliary totalizer elements geared to and operable in unison with the corresponding main elements, said main and auxiliary elements mounted in a shiftable framework, and a set of amount actuators for coacting with the main and auxiliary totalizer elements, the combination of a constant displacement device for shifting the framework to aline either the main or the auxiliary totalizer elements with the actuators; means including a member positionable in two positions to control the constant displacement device to cause either the main or the auxiliary elements to be alined with the actuators, said member normally in position to cause the main elements to be alined with the actuators; yieldably-operated means to position the member to cause the auxiliary elements to be alined with the actuators in overdraft total-taking operations; means effective in adding and subtracting operations to block movement of the yieldably-operated means; means effective when the balance totalizer is in a positive condition to block movement of the yieldably-operated means to retain the main elements in alinement with the actuators; and means operable when the balance totalizer becomes overdrawn to move the second blocking means to ineffective position to cause the auxiliary elements to coact with the actuators in overdraft total-taking operations to obtain a true negative total.

9. In a machine of the class described, having a balance totalizer, comprising a main totalizer element for each denominational order and a corresponding auxiliary totalizer element for each main element, said corresponding main and auxiliary elements geared together for unitary movement, amount actuators for coacting with the main totalizer elements in all operations except overdraft total-taking operations, and for coacting with the auxiliary totalizer elements in overdraft total-taking operations to obtain a true negative total, and a shiftable framework for supporting the main and auxiliary totalizer elements for horizontal shifting movement to selectively aline said sets of elements with the actuators, the combination of two spaced-apart disks mounted on the shiftable framework; an operable arm for each disk; a projection on each arm constructed and arranged to coact with the corresponding disk; a constant displacement device for operating the arms in opposite directions pincher fashion to cause the projections to embrace the disks; sensing levers mounted on each projection; means including a positionable member coacting with the sensing levers to cause either the main or auxiliary totalizer elements to be alined with the actuators; yieldably-operated means to position the member, said yieldably-operated means normally effective to position said member so as to cause the main elements to be alined with the actuators; means including an arm controlled by the algebraic condition of the balance totalizer and effective to block movement of the yieldably-operated means when the balance totalizer is not overdrawn to retain the main totalizer elements in alinement with the actuators; means effective when the balance totalizer becomes overdrawn to move the retaining arm to ineffective position; normally ineffective means to block movement of the yieldably-operated means, said blocking means movable to effective position each machine operation; and means effective in total-taking operations to hold the blocking means in ineffective position to cause the yieldably-operated means to position the member so as to cause the auxiliary totalizer elements to be alined with the actuators in overdraft total-taking operations to obtain a true negative balance or total.

10. In a machine of the class described, having a balance totalizer for obtaining true negative totals, a plurality of sets of group totalizers on a common shiftable support, and a single set of actuators for the various sets of group totalizers and for the balance totalizer, the combination of two spaced-apart disks on the common support; a constant displacement device operable each machine operation to embrace the disks; means including a positionable member to vary the field of operation of the constant displacement device to selectively aline the various sets of group totalizers with the actuators; yieldably-operated means to position the member; means including a positionable arm, positioned by the balance totalizer in one position when said totalizer is not overdrawn and positionable in another position when said totalizer is overdrawn; auxiliary positioning means for coacting with the yieldably-operated means to position the member, said positioning means normally retained ineffective by the arm but movable to effective position under control of said arm when an overdraft occurs in the balance totalizer to control movement of said yieldably-operated means to position the member so as to cause a particular set of group totalizers to be alined with the actuators to receive the overdraft obtained from the balance totalizer; and means to render the positioning means ineffective when operations other than total-taking operations are performed in the balance totalizer.

11. In a machine of the class described, having a balance totalizer for obtaining true negative balances, a plurality of sets of group totalizers on a shiftable shaft and a single set of amount actuators for all the sets of group totalizers, and for the balance totalizer, the combination of two spaced-apart disks on the shaft; an arm for each disk; a projection on each arm coacting with the disks; a constant displacement device to operate the arms in pincher fashion to cause the projections to embrace the disks; a sensing lever on each projection; means including a positionable member having positions corresponding to the different sets of group totalizers for coacting with the levers to cause the projections and the disks to selectively aline said different sets of group totalizers with the actuators; yieldably-operated means to move the member from a home or normal position to an extreme position each machine operation; a control lever operatively connected to and operating in unison with the yieldably-operated means; means including a part controlled by the algebraic condition of the balance totalizer, said part located in one position when the balance totalizer is not overdrawn, and located in another position when said balance totalizer is overdrawn; a control member for coacting with the control lever, said member operated by the part and retained in an ineffective position by said part when the balance totalizer is not overdrawn, but movable to an effective position by said part when an overdraft occurs in the balance totalizer to limit the positioning movement of the control lever, the yieldably-operated means, and the positionable member, to cause a certain set of group totalizer elements to be alined with the actuators to receive the overdraft obtained from the balance totalizer; and means to restore the control member to ineffective position when other than total-taking operations are performed in the balance totalizer.

References Cited in the file of this patent

UNITED STATES PATENTS

| | | |
|---|---|---|
| 1,189,279 | Midgley | July 4, 1916 |
| 2,055,703 | Perkins | Sept. 29, 1936 |
| 2,118,588 | Butler | May 24, 1938 |
| 2,192,164 | Neureiter et al. | Feb. 27, 1940 |